United States Patent
Taku

(10) Patent No.: US 6,275,663 B1
(45) Date of Patent: Aug. 14, 2001

(54) CAMERA AND CARTRIDGE LOADING APPARATUS FOR CAMERA

(75) Inventor: Masakazu Taku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/332,515

(22) Filed: Jun. 14, 1999

(30) Foreign Application Priority Data

Jun. 22, 1998 (JP) .................................................. 10-174280

(51) Int. Cl.⁷ .................................................. G03B 17/02
(52) U.S. Cl. .................................................. 396/538
(58) Field of Search .................................... 396/511, 512, 396/513, 514, 515, 516, 535, 536, 537, 538

(56) References Cited

U.S. PATENT DOCUMENTS

| | | | |
|---|---|---|---|
| 4,459,000 | 7/1984 | Sekine et al. | 354/211 |
| 5,040,010 | * 8/1991 | Arai | 396/538 |
| 5,247,325 | 9/1993 | Takahashi | 354/275 |
| 5,422,695 | * 6/1995 | Katagiri | 396/403 |
| 5,697,007 | * 12/1997 | Nishimura | 396/535 |
| 5,884,111 | * 3/1999 | Seamans | 396/538 |
| 5,893,654 | * 4/1999 | Pagano et al. | 396/390 |
| 5,923,904 | * 7/1999 | Negishi | 396/6 |

FOREIGN PATENT DOCUMENTS 0 703 487   3/1996   (EP) .

* cited by examiner

Primary Examiner—David M. Gray
(74) Attorney, Agent, or Firm—Robin, Blecker & Daley

(57) ABSTRACT

A cartridge loading apparatus for a camera includes a cartridge chamber into which a film cartridge is loaded, a first setting member for setting a film outlet of the film cartridge to orient in a predetermined direction in a state where the film cartridge has been completely loaded into the cartridge chamber, and a second setting member for setting the film outlet of the film cartridge to orient in a direction angularly deviating from the predetermined direction when the film cartridge passes, a cartridge insertion opening of the cartridge chamber.

40 Claims, 23 Drawing Sheets

CAMERA AND CARTRIDGE LOADING APPARATUS FOR CAMERA

BACKGROUND OF THE INVENTION

1. Field of the Invention

The present invention relates to an optical apparatus, such as a camera, having a cartridge chamber in which a film cartridge is to be loaded.

2. Description of Related Art

Recently, a film cartridge having a new form different from the forms of conventional film cartridges has been proposed. In the film cartridge having the new form, a film leading end is not led out of the cartridge unlike the conventional film cartridges. When the cartridge is loaded in a camera or the like, a film is first reeled out of the cartridge and is then advanced to a film take-up spool with thrust driving.

The film in the new cartridge is given with a tendency to curl, i.e., core-set curl, which causes the film to wind around a spool in the cartridge. When the film is moved along a film transport path with the thrust driving, the film is forced to round in the widthwise direction into an arcuate shape due to the core-set curl, and a force for transporting the film from the cartridge with the thrust driving is imparted to the whole of film extending out of the cartridge so that the pliable film can reach the film take-up spool.

In this connection, if a film outlet 1h of a film cartridge 1 is set to locate in the same direction as a film transporting direction that is perpendicular to the optical axis of a photographing lens, as shown in FIG. 20, the film extending out of the cartridge with the thrust driving cannot maintain the arcuate shape of a radius R due to the presence of a pressure plate, etc., and a buckled portion 18a occurs in the arcuate film.

Additionally, in FIG. 20, reference numeral 1i denotes a door for opening and closing the film outlet 1h of the film cartridge 1. When the door 1i is closed, the film outlet 1h is perfectly shielded against light. Reference numeral 18 denotes a film which has been thrust (pushed) out of the film cartridge 1.

If the buckled portion 18a occurs in the arcuate film in such a manner, the thrust force is no longer imparted to the leading end of the film 18. If the thrust driving is further continued in such a condition, the film 18 is bent at the buckled portion 18a, thus resulting in that it becomes impossible to not only thrust the film, but also rewind the film because the leading end of the film is folded one part over another part.

Therefore, the film outlet 1h of the film cartridge 1 is generally set to orient rearward about four degrees with respect to the film transporting direction 18b (see FIG. 22) that is perpendicular to the optical axis of the photographing lens, so that, as shown in FIG. 21, the film can always maintain the arcuate shape of the radius R during the thrust driving.

As seen from FIG. 22 which shows a cross-section of a camera, if the film outlet 1h of the film cartridge 1 is set to orient rearward an angle E, for example, about four degrees, with respect to the film transporting direction 18b that is perpendicular to the optical axis of the photographing lens, for ensuring the film extended out of the cartridge to take an optimum arcuate shape during the thrust driving, a problem arises in that a part of the film cartridge, including the film outlet 1h, protrudes in the back-and-forth direction of the camera, and a thickness of the camera increases correspondingly.

One conceivable method to suppress such an increase in thickness of the camera, i.e., to minimize a thickness F of the camera in the direction of an optical axis 14a of a photographing lens 14, is to form an outer casing cover 8 of metal and construct a part of a cartridge chamber 9, which is formed of plastic, by the outer casing cover 8, as shown in FIG. 22.

With the above method, however, because the cartridge chamber 9 has a limit in its wall thickness for ensuring positive shield against light, edges 9b, 9c and 9d of the plastic-made cartridge chamber 9, which are positioned at the boundaries with respect to the outer casing cover 8, cannot be formed into very sharp edges, so that steps are produced between the edges 9b, 9c, 9d and the outer casing cover 8.

As seen from FIG. 23 which shows a bottom surface of the camera, a cartridge insertion opening formed at the bottom of a camera body, therefore, also has steps between the edges 9b, 9c, 9d and the outer casing cover 8.

Because of the steps between the edges 9b, 9c, 9d and the outer casing cover 8, gaps are left between an inner periphery of the cartridge insertion opening and an outer periphery 13a of a packing 13, which is provided around a cartridge chamber lid 2 to be fitted to the cartridge insertion opening, when the cartridge chamber lid 2 is closed. Accordingly, the cartridge chamber 9 cannot be sufficiently shielded against light.

BRIEF SUMMARY OF THE INVENTION

An object of the invention is to provide an optical apparatus, such as a camera, and a cartridge loading apparatus, with which a thickness of the optical apparatus can be reduced and a cartridge insertion opening can be sufficiently shielded against light.

To attain the above object, in accordance with one aspect of the invention, there is provided a cartridge loading apparatus for a camera, comprising a cartridge chamber into which a film cartridge is loaded, first setting means for setting a film outlet of the film cartridge to orient in a predetermined direction in a state where the film cartridge has been completely loaded into the cartridge chamber, and second setting means for setting the film outlet of the film cartridge to orient in a direction angularly deviating from the predetermined direction when the film cartridge passes a cartridge insertion opening of the cartridge chamber. According to the above aspect of the invention, the cartridge insertion opening can be formed to have an opening width, i.e., a wall thickness, with satisfactory flexibility in design. As a result, the thickness of an optical apparatus such as a camera can be reduced, and the cartridge insertion opening can be sufficiently shielded against light.

The above and further aspects and features of the invention will become apparent from the following detailed description of preferred embodiments thereof taken in conjunction with the accompanying drawings.

DETAILED DESCRIPTION OF THE INVENTION

Figure 1:
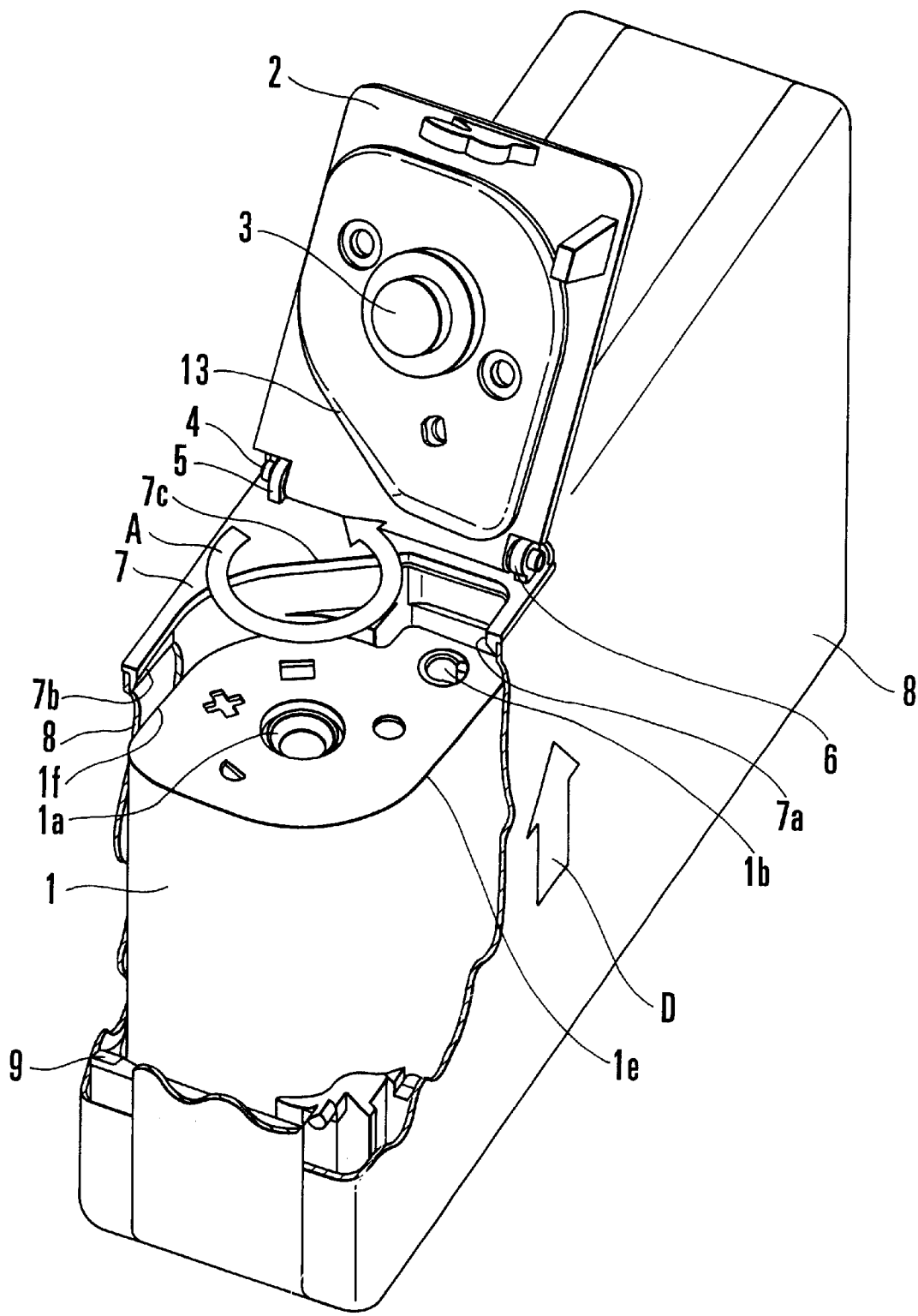
FIG. 1 is a perspective view, partly in fragment, of a camera according to a first embodiment of the invention.

Hereinafter, preferred embodiments of the invention will be described in detail with reference to the drawings. In the following figures, similar components to those described above in connection with the related art are denoted by the same reference numerals. Also, in the following embodiments, similar components are denoted by the same reference numerals.

First Embodiment

Figure 2:
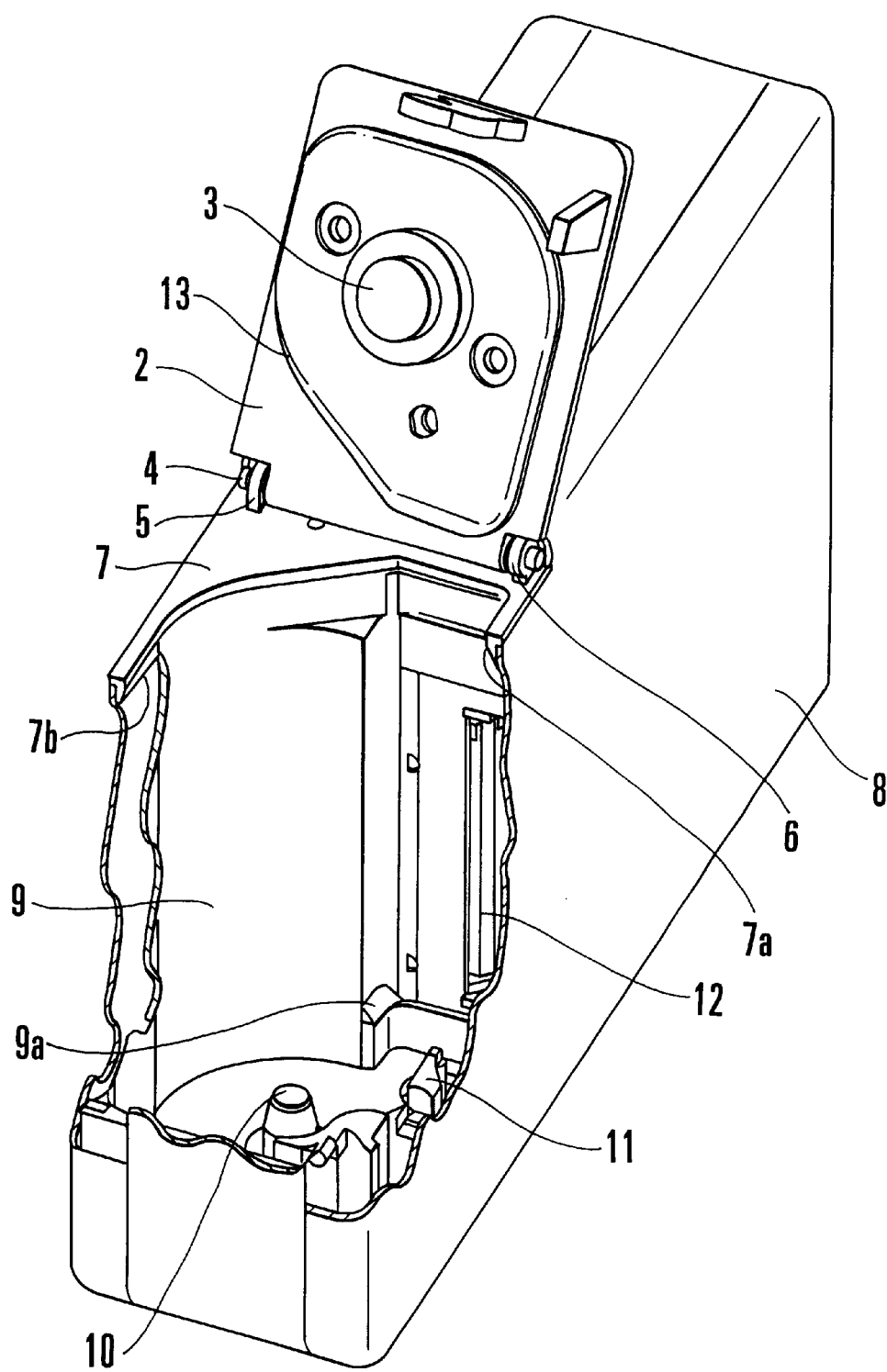
FIG. 2 is a perspective view, partly in fragment, of a cartridge chamber of the camera of FIG. 1.
Figure 3:
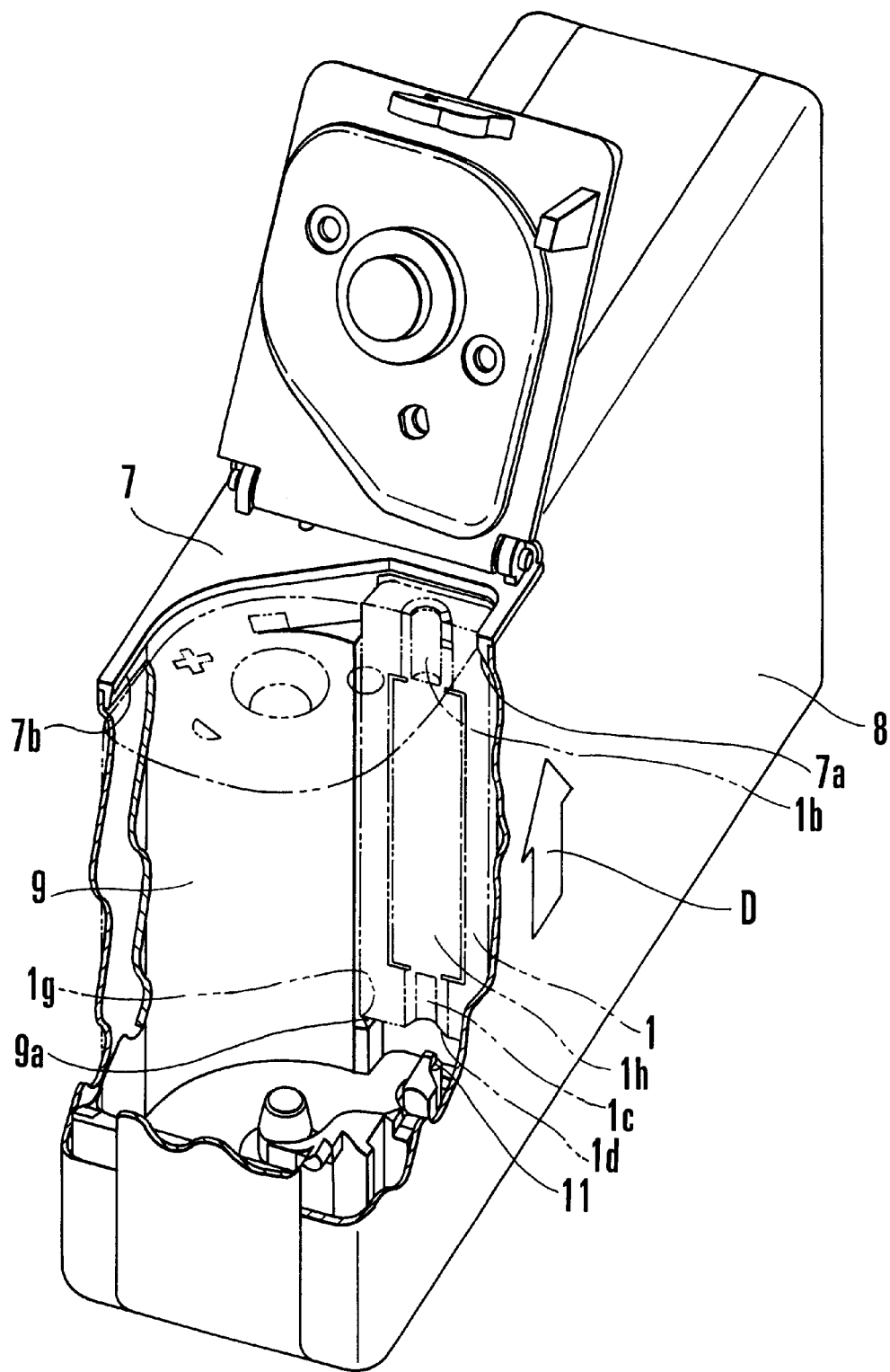
FIG. 3 is a perspective view, partly in fragment, of the camera of FIG. 1, showing a state that a film cartridge is being ejected.
Figure 4:
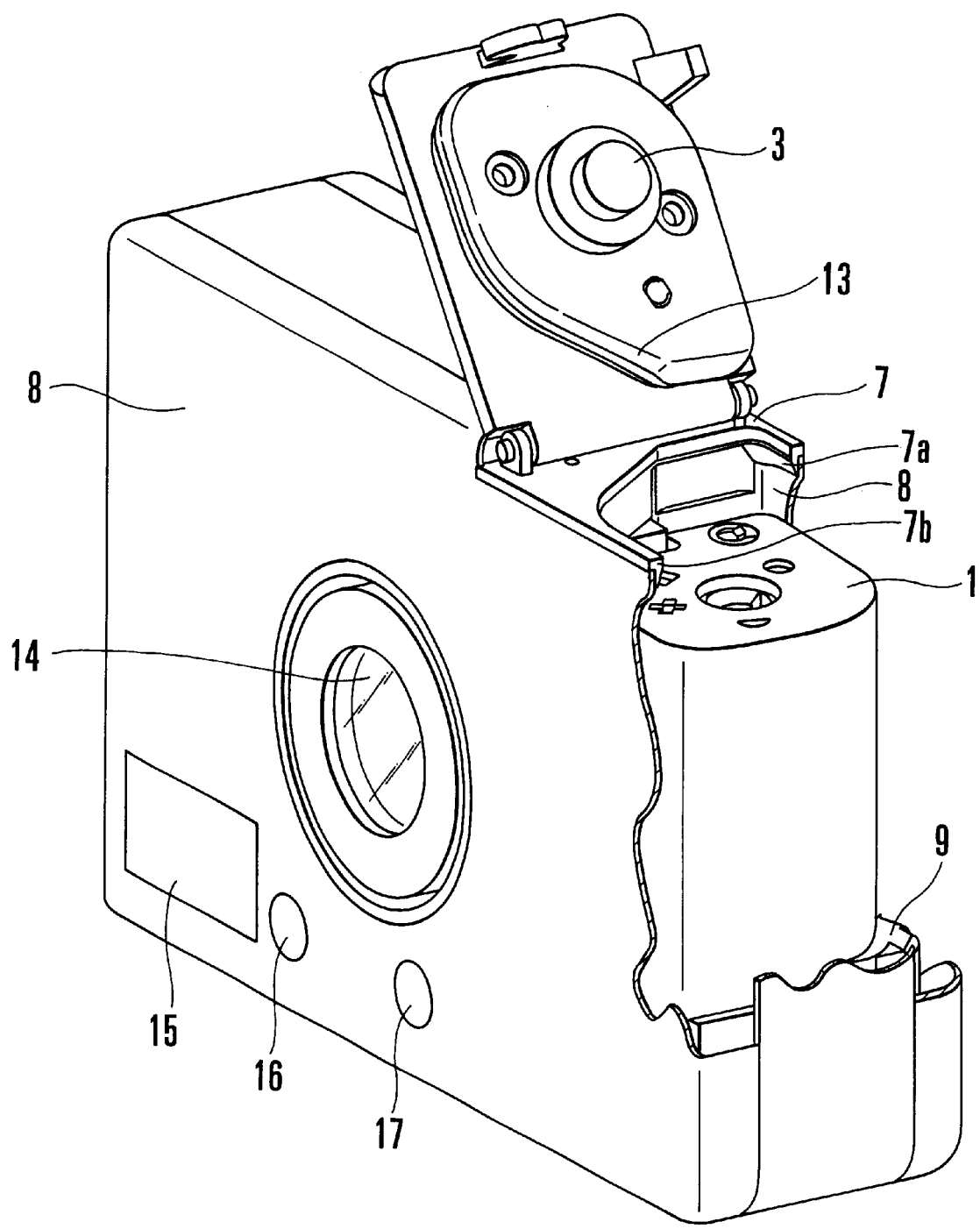
FIG. 4 is a perspective view, partly in fragment, of the camera in the state shown in FIG. 1 as viewed from front.
Figure 5:
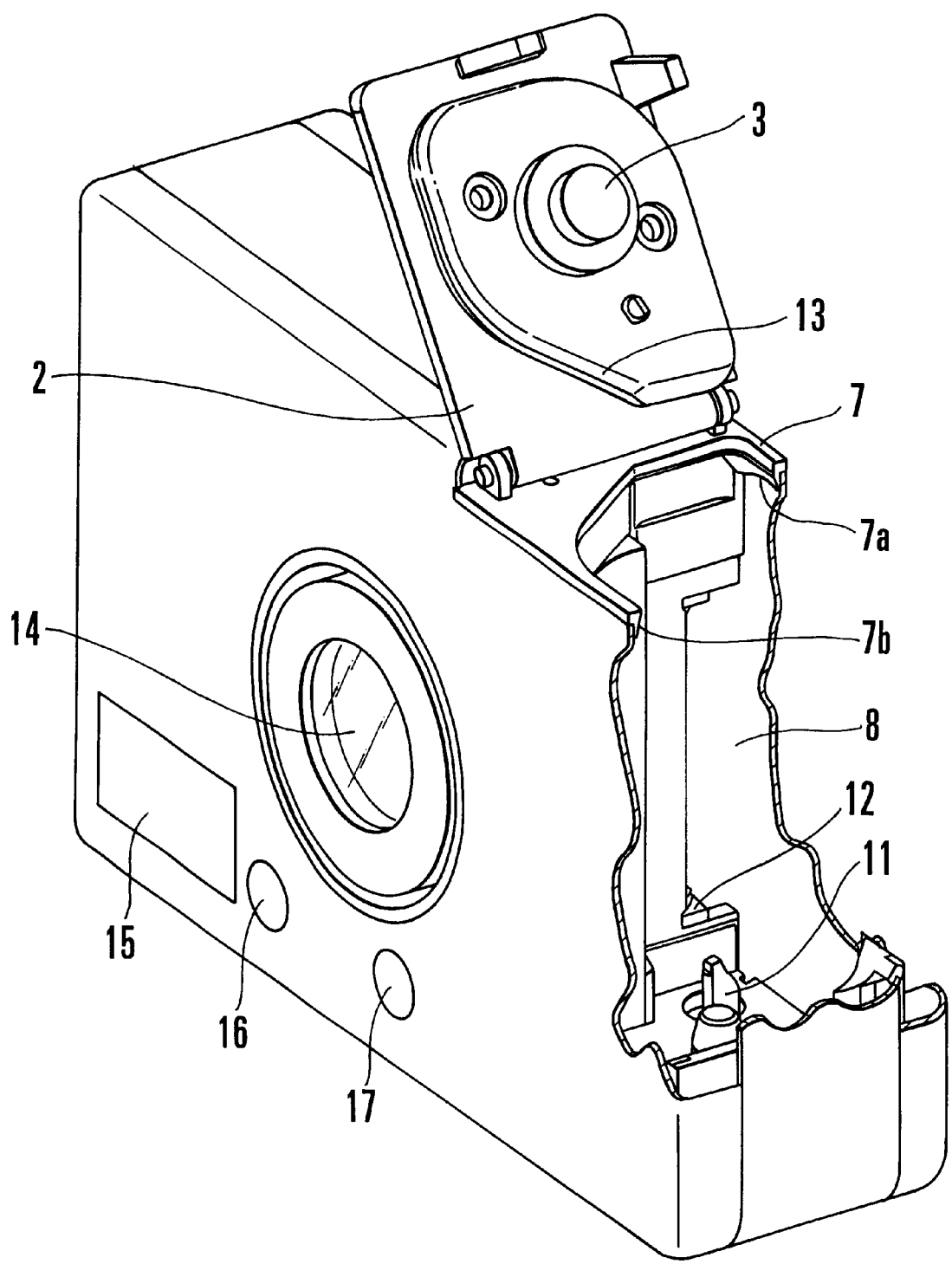
FIG. 5 is a perspective view, partly in fragment, of the camera in the state shown in FIG. 2 as viewed from front.
Figure 6:
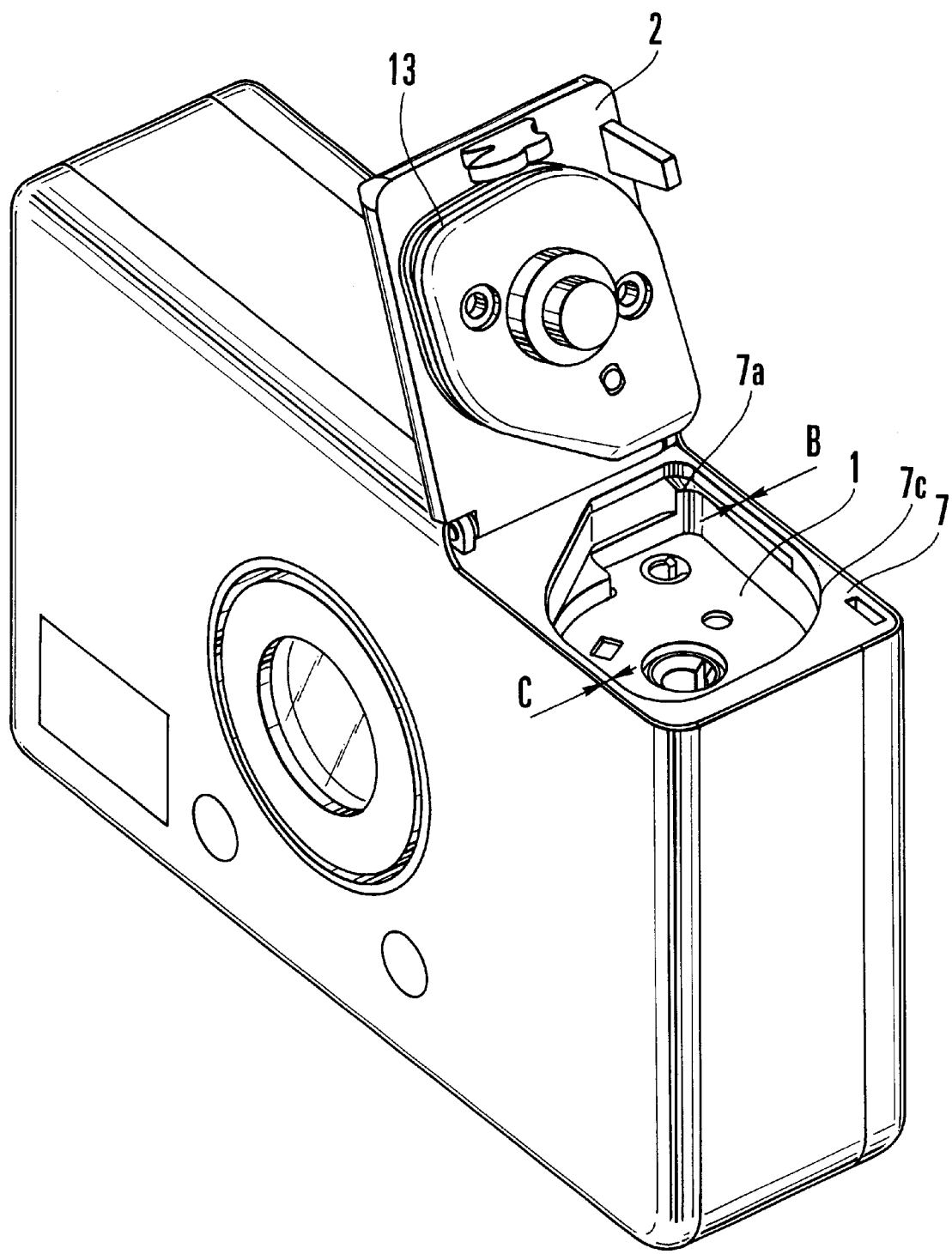
FIG. 6 is a perspective view of the camera in the state shown FIG. 1 as viewed from front.
Figure 7:
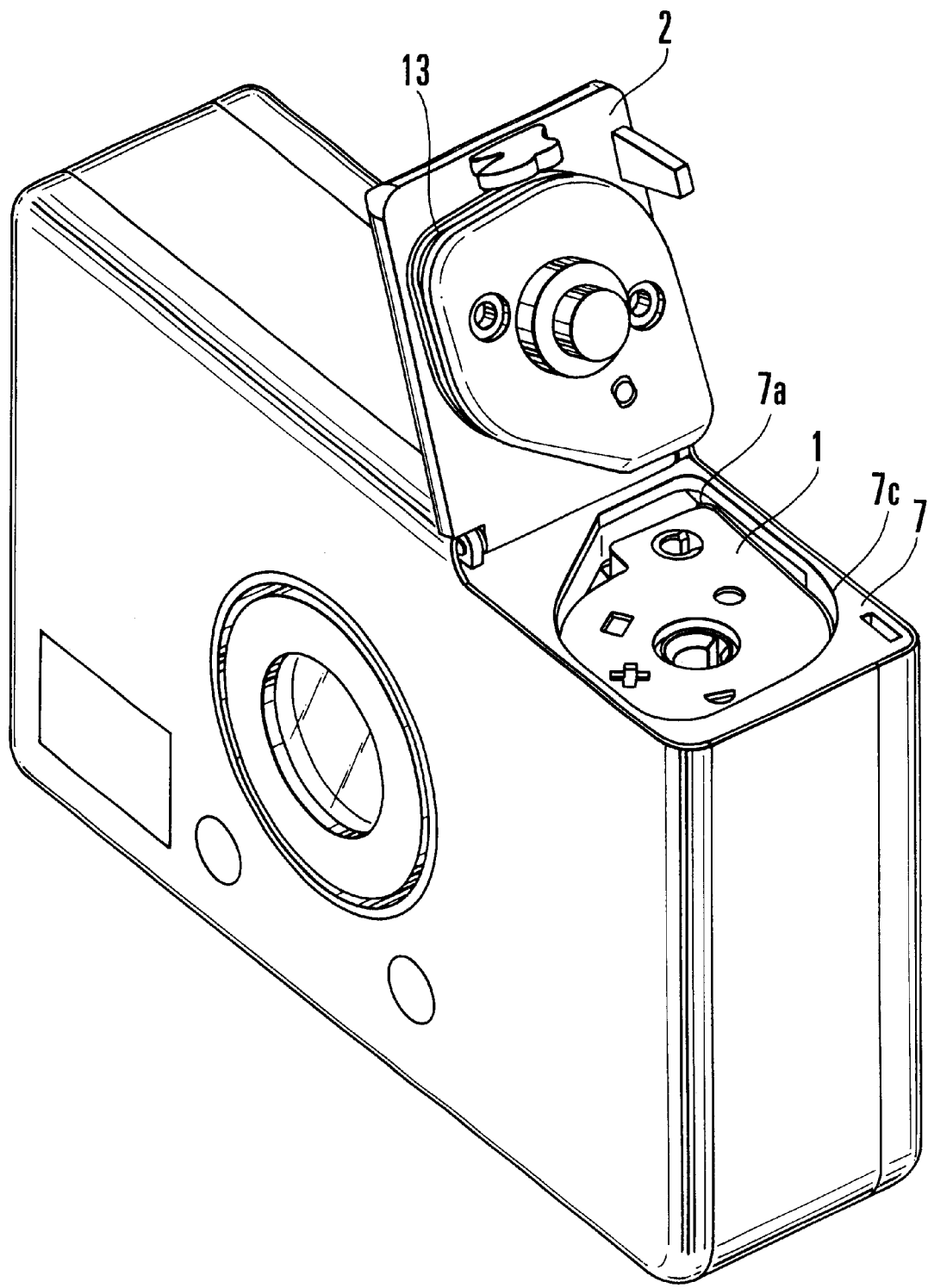
FIG. 7 is a perspective view of the camera as viewed from front, showing a state during transfer from the state shown in FIG. 1 to the state shown in FIG. 3 that the film cartridge is slightly ejected.
Figure 8:
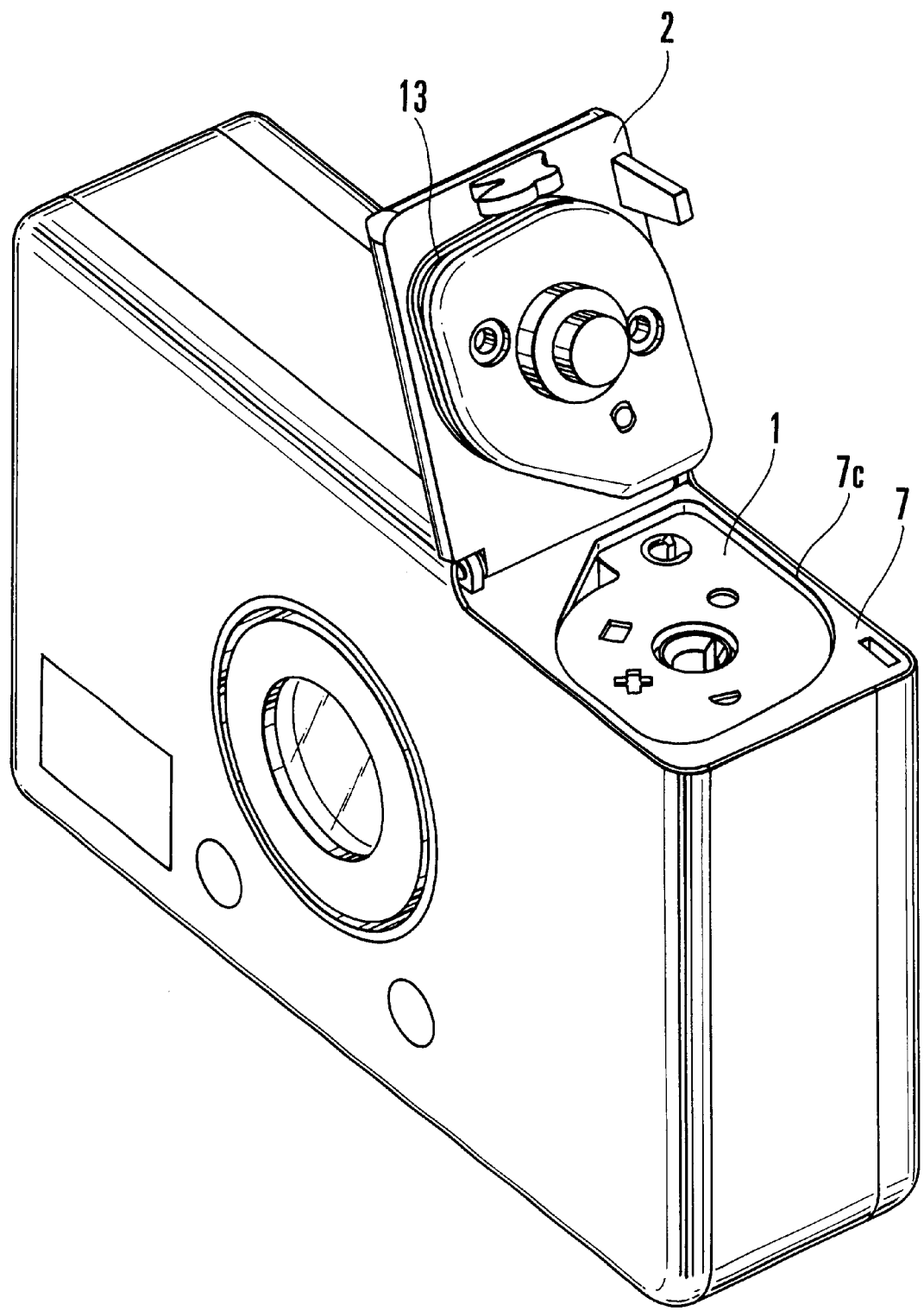
FIG. 8 is a perspective view of the camera in the state shown in FIG. 3 as viewed from front.
Figure 9:
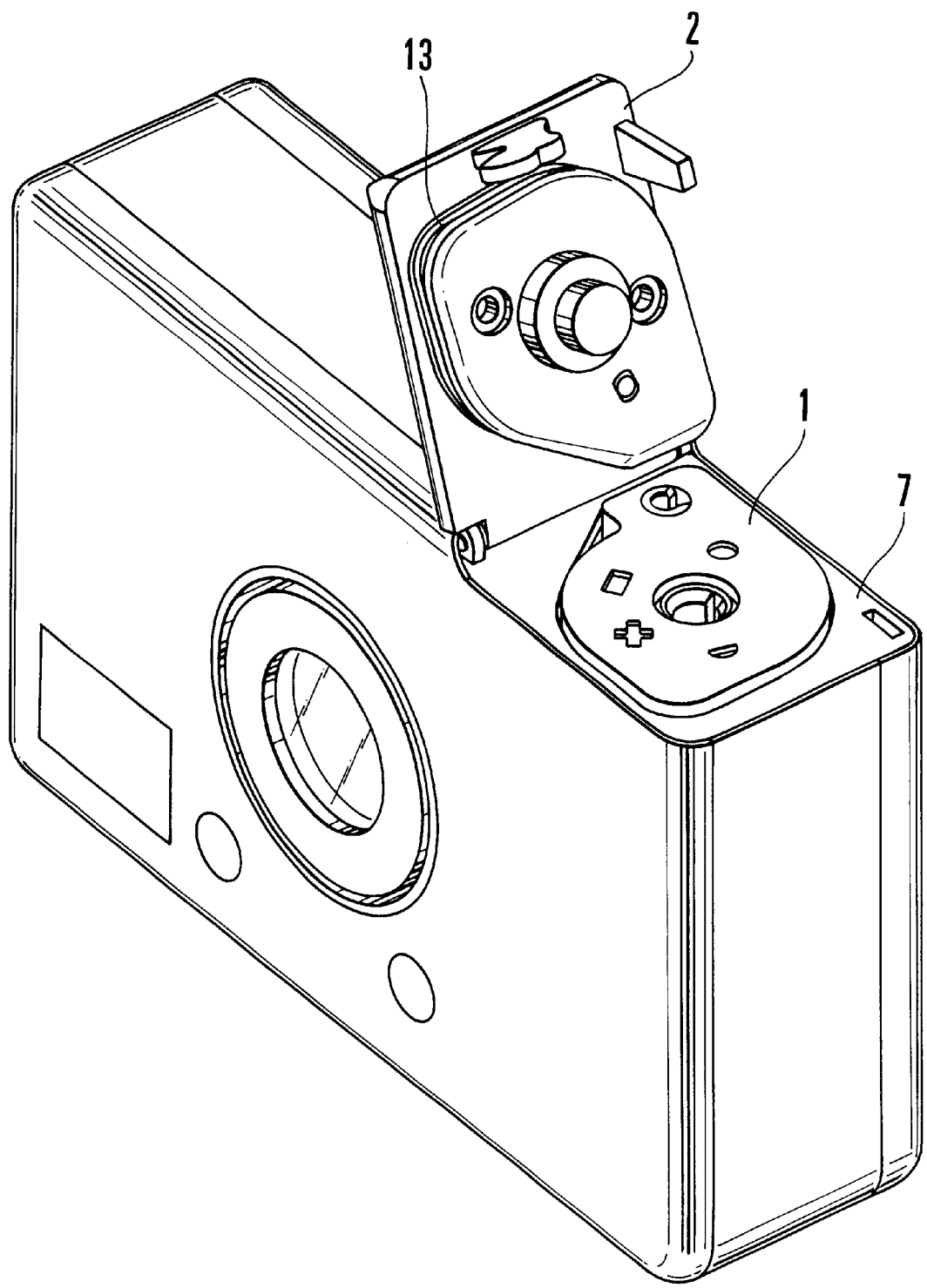
FIG. 9 is a perspective view of the camera as viewed from front, showing a state that the film cartridge is further ejected from the state shown in FIG. 8 and ejection of the cartridge is completed.

FIGS. 1 to 9 show a first embodiment of the invention. Specifically, FIG. 1 is a perspective view, partly in fragment, of a camera as viewed from rear, showing a state that a cartridge chamber lid is opened and is in a state immediately before the start of ejection of a film cartridge. FIG. 2 is a perspective view, partly in fragment, of the camera of FIG. 1 as viewed from rear, showing a state that the film cartridge is not loaded in a cartridge chamber. FIG. 3 is a perspective view, partly in fragment, of the camera of FIG. 1 as viewed from rear, showing a state that the film cartridge is being ejected. FIG. 4 is a perspective view, partly in fragment, of the camera in the state shown in FIG. 1 as viewed from front. FIG. 5 is a perspective view, partly in fragment, of the camera in the state shown in FIG. 2 as viewed from front. FIG. 6 is a perspective view of the camera in the state shown in FIG. 1 as viewed from front. FIG. 7 is a perspective view of the camera as viewed from front, showing a state during transfer from the state shown in FIG. 1 to the state shown in FIG. 3 that the film cartridge is slightly ejected. FIG. 3 is a perspective view of the camera in the state shown in FIG. 3 as viewed from front. FIG. 9 is a perspective view of the camera as viewed from front, showing a state that the film cartridge is further ejected from the state shown in FIG. 8 and ejection of the cartridge is completed.

Figure 20:
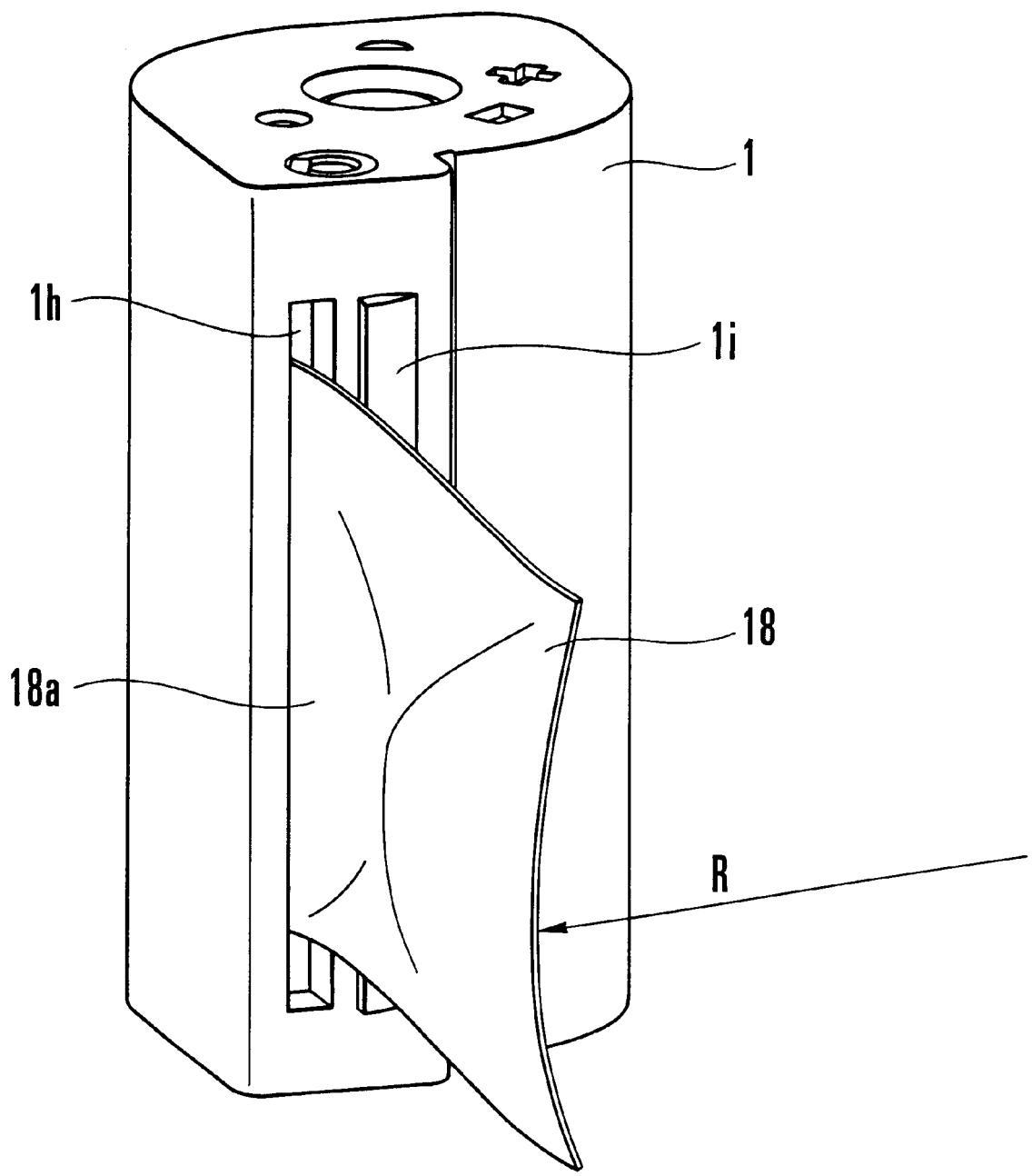
FIG. 20 is a perspective view for explaining a state that a film cannot maintain an arcuate shape and undergoes buckling.
Figure 21:
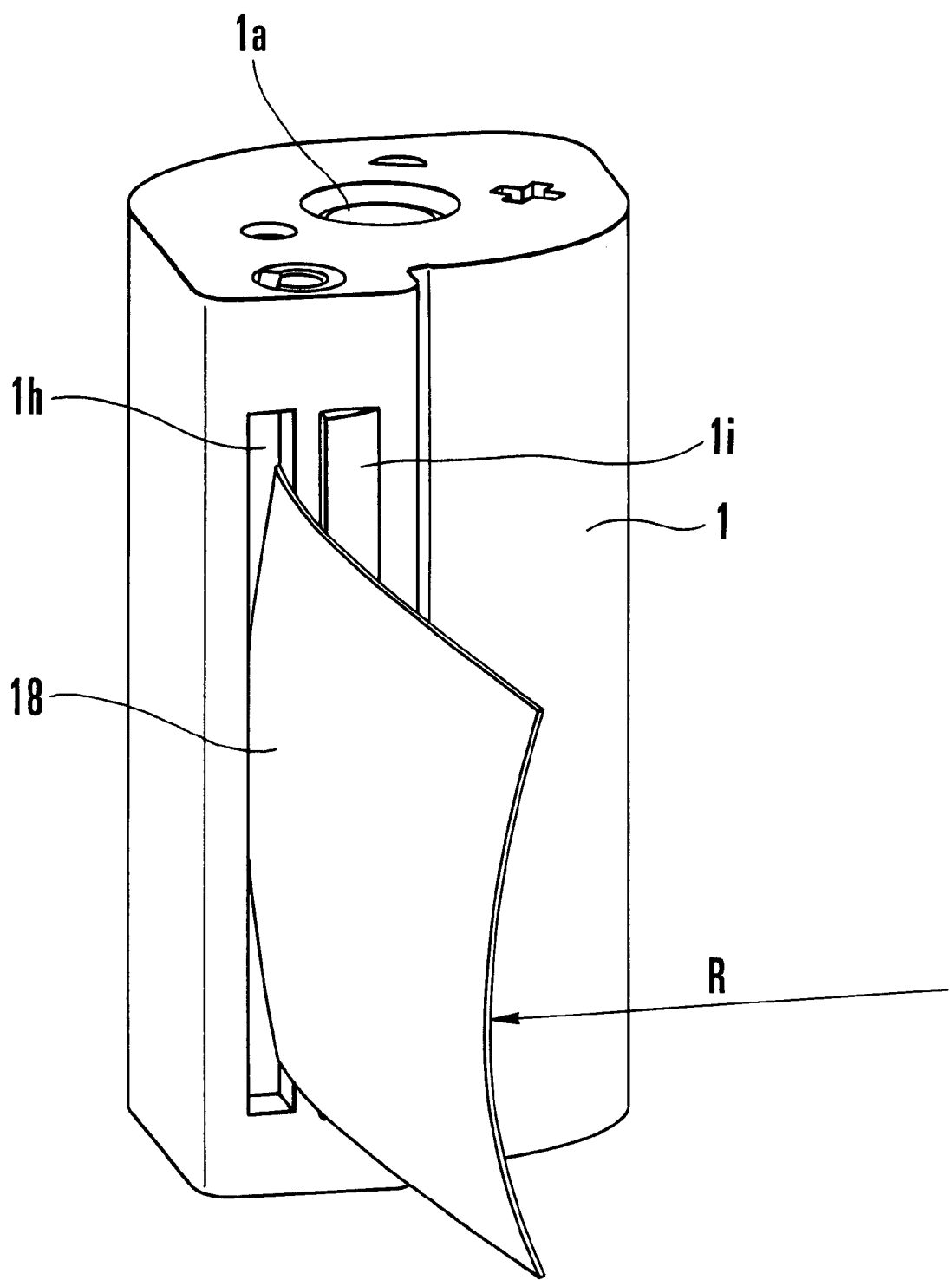
FIG. 21 is a perspective view for explaining a state that the film can maintain an arcuate shape.

Referring to FIG. 1, reference numeral 1 denotes a film cartridge having a film stored therein such that the film is wound around a cartridge spool 1a. When a film outlet opening/closing actuation member 1b is rotated, a film outlet 1h, described before in connection with FIG. 20, is opened to permit transporting, i.e., thrust driving, of the film.

Reference numeral 2 denotes a cartridge chamber lid for opening and closing a cartridge chamber 9 in which the film cartridge 1 is to be loaded. A packing 13 which is to be fitted to a cartridge insertion opening 7c of the cartridge chamber 9 to shield light and a bearing 3 which is provided for rotatably supporting the cartridge spool la are both provided on an inner surface of the cartridge chamber lid 2. Reference numeral 4 denotes a shaft penetrating hinges 5 and 6 and the cartridge chamber lid 2. The cartridge chamber lid 2 is rotatable about the shaft 4 to open and close.

Reference numeral 7 denotes a cartridge insertion opening member which is made of plastic and is fitted to a camera body cover 8 made of metal. As shown in FIG. 7, the cartridge insertion opening member 7 has the opening 7c formed therein to have an entirely continuous periphery for fitting with the packing 13.

Figure 22:
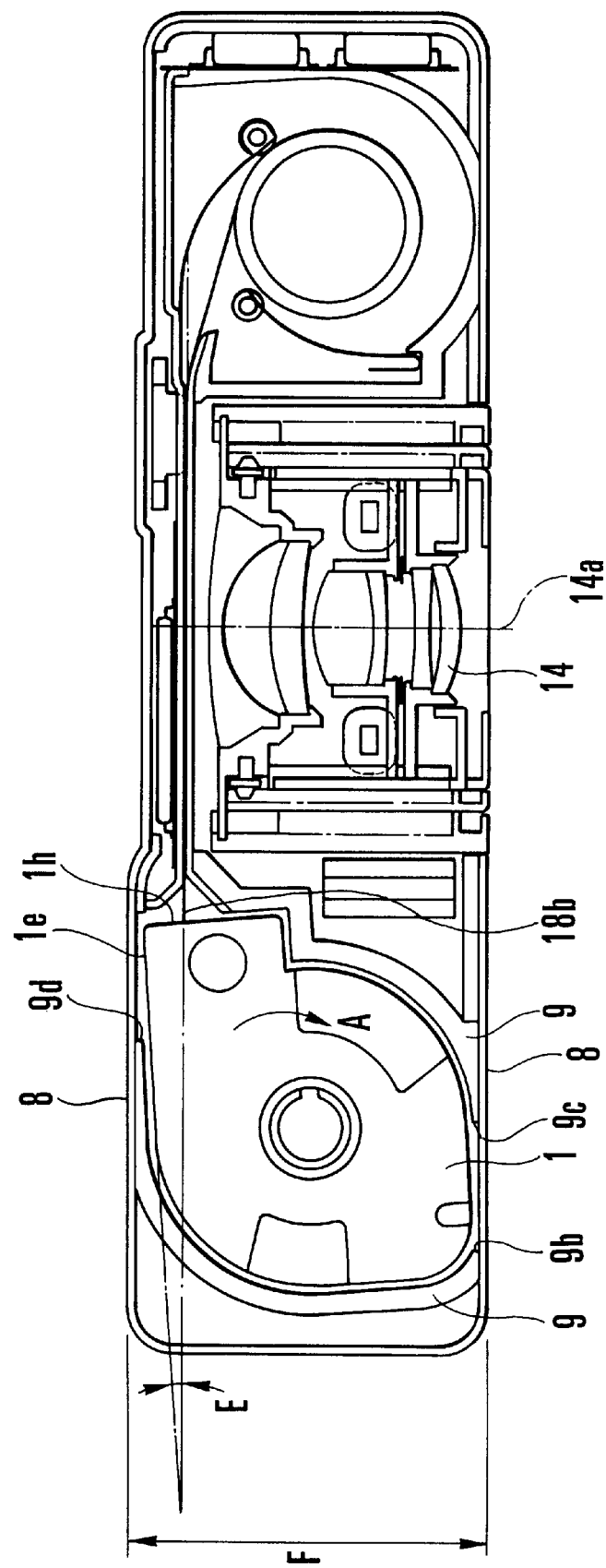
FIG. 22 is a cross-sectional view of a camera, showing a state that a film is under thrust driving.
Figure 23:
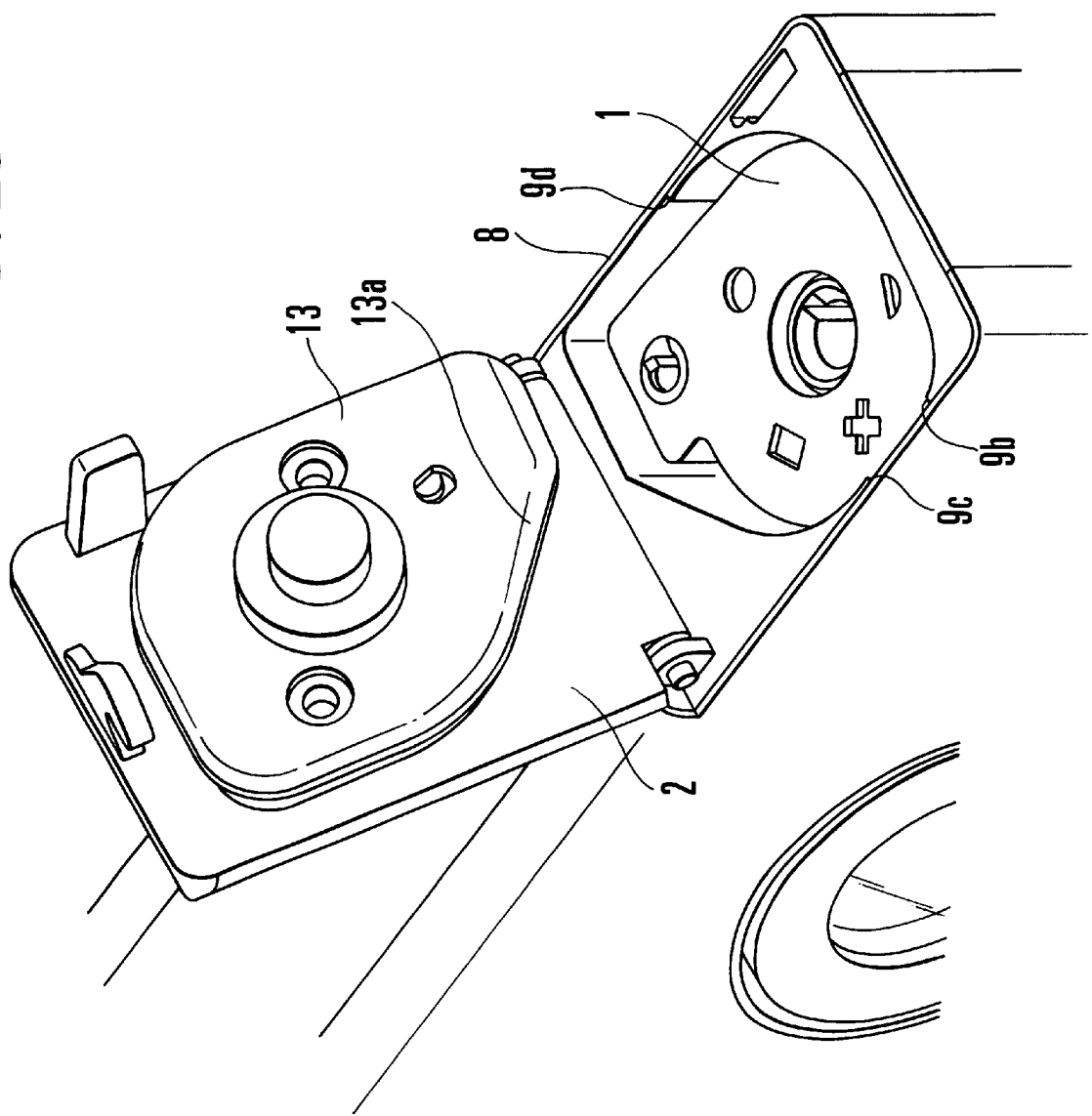
FIG. 23 is a partial perspective view of the camera as viewed from front for explaining a problem to be solved by the invention.

In the first embodiment, the opening 7c and slopes 7a and 7b (to be described later) of the cartridge insertion opening member 7 are shaped so that the film cartridge 1 takes the same state as that shown in FIG. 22 when the film cartridge 1 has been loaded into its completely loaded position in the cartridge chamber 9, i.e., so that the film cartridge 1 takes a phase rotated (changed in phase) by an angle E in the direction opposite to the arrow A (hereinafter referred to as the setting phase) with respect to a phase taken by the film cartridge 1 when the film cartridge 1 passes the position of the opening 7c of the cartridge insertion opening member 7 (hereinafter referred to as the ejection phase).

Conversely, when the film cartridge 1 is ejected, the film cartridge 1 is rotated by the angle E in the direction of the arrow A to change its phase from the setting phase, followed by reaching the opening 7c.

In the present specification, the term "phase" represents an angle of the cartridge relative to the cartridge chamber in a plane perpendicular to the take-up spool of the cartridge, and the term "position" represents a position in the direction in which the cartridge is loaded in the cartridge chamber.

Specifically, in the first embodiment, the term "ejection phase" represents a phase at which a ridgeline 1e of the film cartridge 1 extending in the direction toward the film outlet 1h is perpendicular to an optical axis 14a of a photographing lens 14 (i.e., phase of the film cartridge 1 at which the film thrusting direction from the film outlet 1h of the film cartridge 1 is perpendicular to the photographing optical axis), and corresponds to a position where the size of the film cartridge 1 in the direction of the photographing optical axis is minimized.

Also, the term "setting phase" represents a phase at which the film cartridge 1 has been rotated about four degrees with respect to the ejection phase in the direction opposite to the direction of arrow A in FIG. 1 (i.e., toward the rear side of the camera body), and corresponds to a phase at which the film is subjected to thrust driving as described later.

As shown in FIG. 1, the slopes 7a and 7b for changing the phase of the film cartridge 1 form the setting phase to the ejection phase in the direction of arrow A during the cartridge ejection stroke are formed on the front and rear sides of the camera body, respectively, to be continuously extended from corresponding edges of the opening 7c.

While the camera body cover 8 is formed of a metal plate, by way of example, in the first embodiment, the camera body cover 8 may be a plastic-made cover. In this case, it is needless to say that not only the cartridge insertion opening member 7, but also the slopes 7a and 7b for changing the phase of the film cartridge 1 can be formed integrally with the camera body cover 8.

As shown in FIG. 2, a slope 9a is formed in an inner lower surface of the cartridge chamber 9 at such a position that when the film cartridge 1 is loaded and pushed into the cartridge chamber 9 with a predetermined stroke, a side portion of the film outlet 1h of the film cartridge 1, shown in FIG. 3, abuts on the slope 9a, causing the film cartridge 1 to rotate for changing its phase from the ejection phase to the setting phase.

Reference numeral 10 denotes a fork shaft which engages an engagement hole formed in the spool shaft 1a of the film cartridge 1, and which has a key (not shown) for transmitting rotation of the fork shaft 10 to the spool shaft 1a upon engagement with the spool shaft 1a. The fork shaft 10 is coupled to a motor (not shown) to rotate the spool shaft 1a of the film cartridge 1, thereby performing feeding (thrust driving) and rewinding driving of the film.

Reference numeral 11 denotes an opening/closing driver, which is to be fitted to an opening/closing actuation member 1c of the film outlet 1h of the film cartridge 1, shown in FIG. 3, to open and close the film outlet 1h of the film cartridge 1. Reference numeral 12 denotes a film gate through which the film is reeled out to a photographing aperture.

In FIG. 4, reference numeral 14 denotes a photographing lens of the camera, reference numeral 15 denotes a flash emitting unit, reference numeral 16 denotes a viewfinder window, and reference numeral 17 denotes a light measuring window.

The operation of the first embodiment thus constructed will be described below. FIGS. 1, 4 and 6 show a state immediately before ejection of the film cartridge 1, i.e., a state that after all or some frames of a film have been exposed and the film has been rewound to be completely reeled in the film cartridge 1, the cartridge chamber lid 2 is opened by pushing an unlock button (not shown) for the cartridge chamber lid 2 and the film cartridge 1 is about to be ejected by an ejector (not shown).

Next, FIG. 7 shows a state that the opening/closing actuation member 1c of the film outlet 1h is at least disengaged from the opening/closing driver 11 by the ejector (not shown), and the film cartridge 1 is ejected up to a position where the film cartridge 1 is rotatable substantially about the center of the cartridge spool shaft 1a.

As shown in FIG. 1, the slopes 7a and 7b provided for rotating the film cartridge 1 to change its phase begin to act on the film cartridge 1 from the state of FIG. 7.

Next, FIGS. 3 and 8 show a state that the film cartridge 1 is further ejected while the film cartridge 1 has been rotated about four degrees in the direction of arrow A in FIG. 1 under the action of the slopes 7a and 7b .

More specifically, in FIGS. 3 and 8, the film cartridge 1 is ejected up to a position past the slope 9a in the cartridge chamber 9, and the phase of the film cartridge 1 is changed to the ejection phase. In the state having the ejection phase, the film cartridge 1 is oriented to have a minimum length in the direction of the optical axis of the photographing lens 14. Accordingly, the cartridge insertion opening member 7 can be formed to have sufficient edge widths B and C around the opening 7c, as shown in FIG. 6. In other words, the opening 7c is entirely formed in the cartridge insertion opening member 7 while leaving sufficiently thick edges or walls. This arrangement enables the entire outer periphery 13a of the packing 13, which is provided integrally with the cartridge chamber lid 2, to be fitted to the opening 7c without leaving gaps. The cartridge chamber 9 can be thereby closed in a completely shielded state against light.

Next, while taking the ejection phase shown in FIG. 8, the film cartridge 1 is further ejected by the ejector (not shown) to move to the state shown in FIG. 9, so that the ejection of the film cartridge 1 is completed.

Stated otherwise, during the ejection stroke in which the film cartridge 1 is moved in the ejecting direction, i.e., in the direction of arrow D in FIG. 1, the ridgelines 1e and 1f of the film cartridge 1, which are rotationally asymmetric about the spool shaft 1a, come into abutment with the slopes 7a and 7b of the cartridge insertion opening member 7. By being thus ejected in the direction of arrow D, the film cartridge 1 is rotated in the direction of arrow A and then passes the opening 7c in the cartridge insertion opening member 7 while taking a phase at which the film cartridge 1 has a minimum thickness in the direction of the optical axis of the photographing lens 14 (i.e., at which the projected film outlet portion of the film cartridge 1 does not protrude in the direction of the photographing optical axis). It is a matter of course that the function of rotating the film cartridge 1 to change its phase can also be fulfilled by only either one of the slopes 7a and 7b .

The operation of loading the film cartridge 1 will now be described.

The operation of loading the film cartridge 1 is a reversal to the above-described operation of ejecting the film cartridge 1, i.e., proceeds in the sequence of FIG. 9–FIG. 8–FIG. 7–FIG. 6. In the loading operation, corresponding to the states of FIGS. 6 to 9, the cartridge chamber lid 2 is gradually closed to change the state from FIG. 9 to FIG. 6, whereby the film cartridge 1 is pushed into the cartridge chamber 9 against the ejector (not shown).

By closing the cartridge chamber lid 2 and pushing the film cartridge 1 into the cartridge chamber 9 to change the state from FIG. 9 to FIG. 8, the film cartridge 1 takes the position shown in FIGS. 8 and 3. When the film cartridge 1 is further pushed in the direction opposite to the direction of arrow D from the above position of FIG. 8, a ridgeline 1g of the film cartridge 1, which is rotationally asymmetric about the spool shaft 1a, comes into abutment with the slope 9a in the cartridge chamber 9, following which the ridgeline 1g slides over the slope 9a. The film cartridge 1 is thereby rotated in the direction opposite to the direction of arrow A from the ejection phase to the setting phase.

Then, the film cartridge 1 is further pushed into the state of FIG. 7, where the film cartridge 1 is fully held in -the setting phase. After that, the opening/closing actuation member 1c of the film outlet 1h of the film cartridge 1 engages the opening/closing driver 11, so that the film cartridge 1 is completely loaded, as shown in FIG. 6.

Second Embodiment

Figure 10:
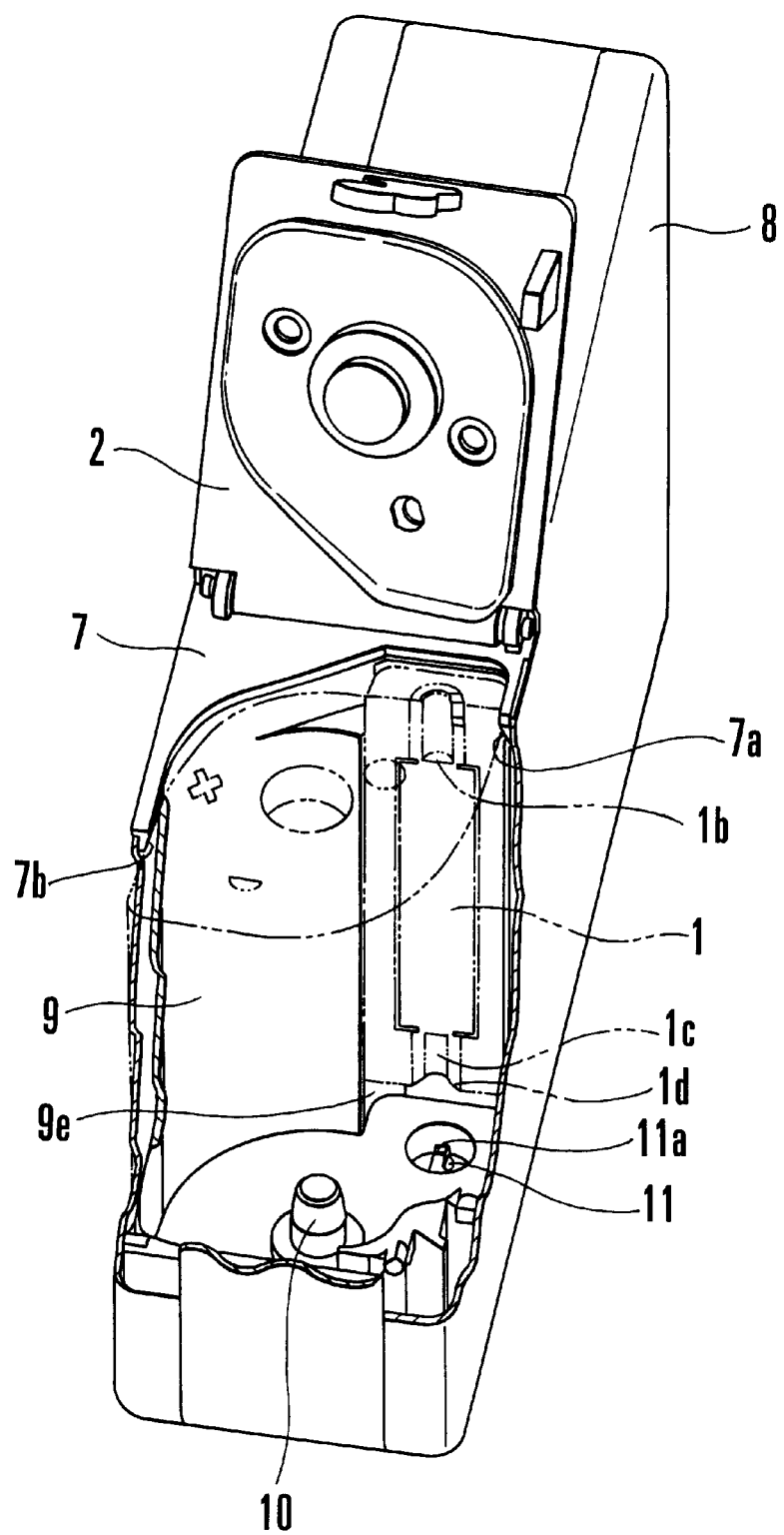
FIG. 10 is a perspective view, partly in fragment, of a camera according to a second embodiment of the invention as viewed from rear, showing a state that a film cartridge is being loaded.

FIG. 10 shows a second embodiment of the invention.

In the second embodiment, as with the first embodiment, the film cartridge 1 begins to be loaded from the ejection phase, and is then pushed into the cartridge chamber 9 to have the setting phase upon the cartridge chamber lid 2 being closed. The second embodiment differs from the first embodiment in that, while the slope 9a is formed in the inner lower surface of the cartridge chamber 9 in the first embodiment as shown in FIG. 3, a space 9e is formed instead of the slope 9a in the second embodiment. In the first embodiment shown in FIG. 3, when the film cartridge 1 is loaded into the cartridge chamber 9, the film cartridge 1 is rotated substantially about the center of the fork shaft 10 under the action of the slope 9a so as to have the setting phase from the ejection phase. On the other hand, in the second embodiment, as shown in FIG. 10, a chamfered surface 1d of the opening/closing actuation member 1c of the film outlet 1h of the film cartridge 1 and a chamfered end 11a of the opening/closing driver 11 are formed such that the opening/closing actuation member 1c and the opening/closing driver 11 are not aligned with each other when the film cartridge 1 is in the ejection phase, but are aligned with each other by self-centering upon engagement between them, causing the film cartridge 1 to rotate to have the setting phase from the ejection phase.

While, in the second embodiment, the opening/closing driver 11 is arranged not to advance and retreat, the opening/closing driver 11 may be constructed to be able to advance and retreat by utilizing the technique disclosed in Japanese Laid-Open Patent Application No. Hei 8-95151. In this case, the film cartridge 1 is first pushed into the cartridge chamber 9 in the ejection phase, and the opening/closing driver 11 is then advanced to protrude into the cartridge chamber 9. Thus, after being completely loaded in the direction opposite to the direction of arrow D, the film cartridge 1 is rotated in the direction opposite to the direction of arrow A upon engagement between the chamfered surface 1d and the chamfered end 11a to take the setting phase from the ejection phase.

Also, in the ejecting operation in the above case, the film cartridge 1 can be changed from the setting phase to the ejection phase by first retracting the opening/closing driver 11 and then rotating the film cartridge 1 in the direction of arrow A, i.e., in the thrust direction, with the fork shaft 10. As compared with the case where the phase of the film cartridge 1 is changed from the setting phase to the ejection phase during the ejection stroke in the direction of arrow D as in the first embodiment, therefore, the ejection stroke in the direction of arrow D can be significantly shortened and the camera size in the direction of height can be reduced correspondingly.

Further, in the above case, the cartridge spool is locked when the film outlet of the film cartridge is closed by the opening/closing driver. Accordingly, by rotating the cartridge spool in the locked state through a fork drive gear, the film cartridge can be rotated in its entirety to change the phase thereof. Stated otherwise, by rotating the fork drive gear to turn the film cartridge rearward after the film cartridge has been loaded, the film outlet of the film cartridge can be set to orient rearward at a predetermined angle.

Figure 11:
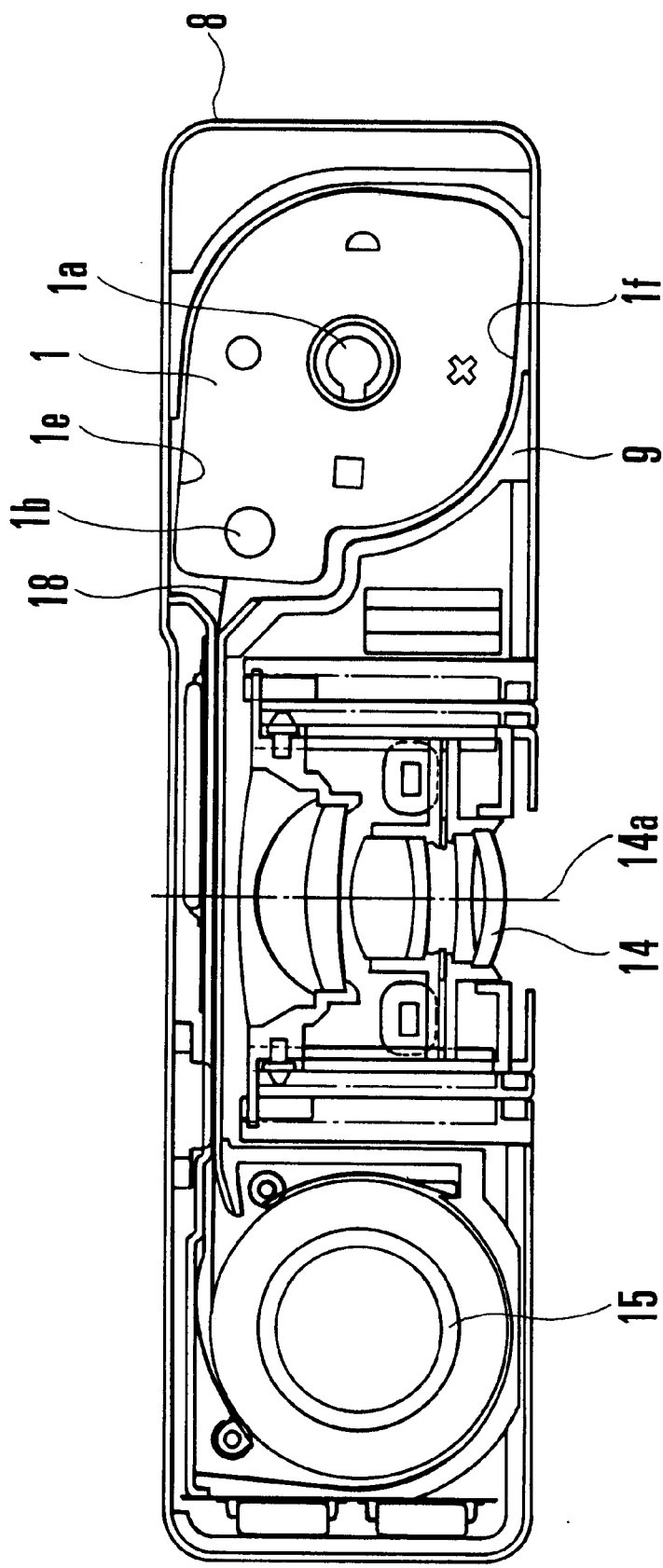
FIG. 11 is a cross-sectional view of the camera of FIG. 10, showing a state that a film is under thrust driving.
Figure 12:
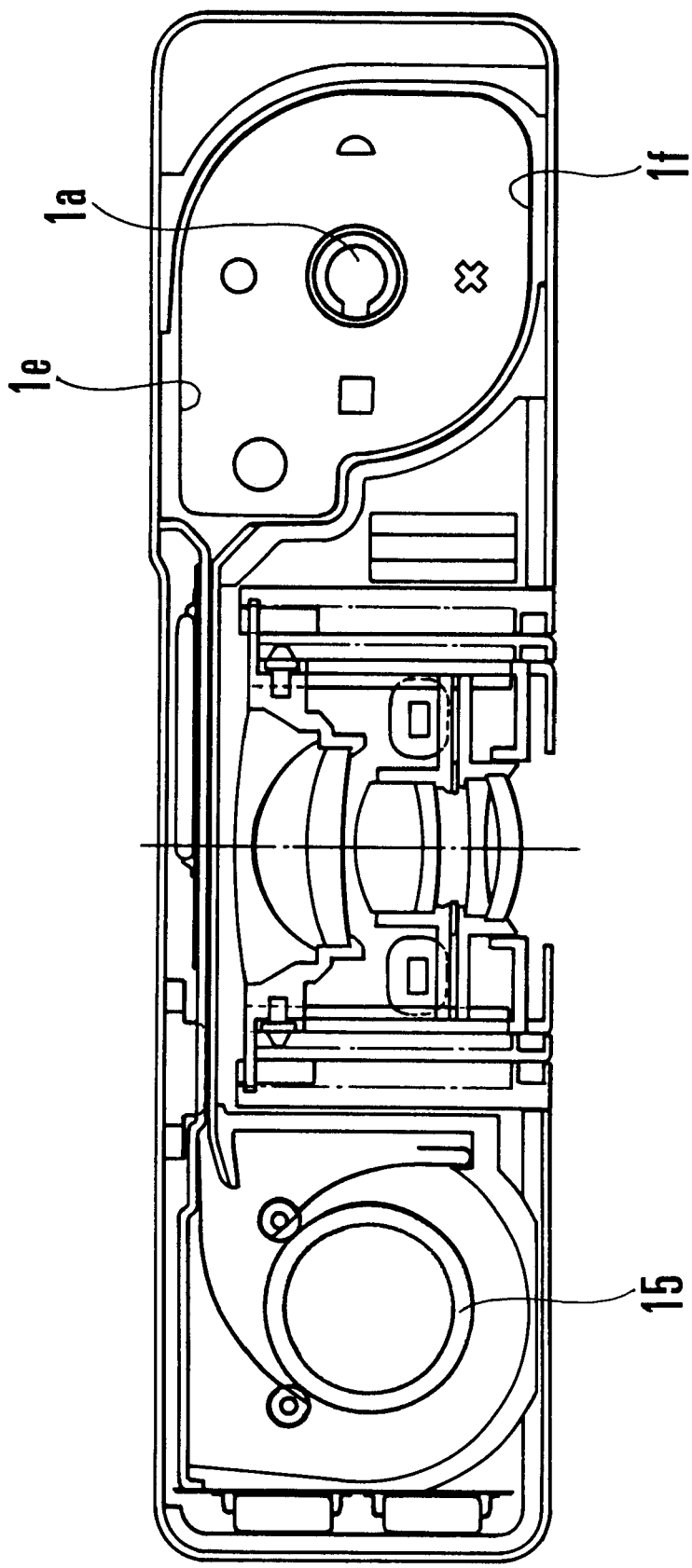
FIG. 12 is a cross-sectional view of the camera of FIG. 10, showing a state that a film cartridge in which a film has been completely rewound has been rotated around a spool thereof about four degrees in the counterclockwise direction.
Figure 13:
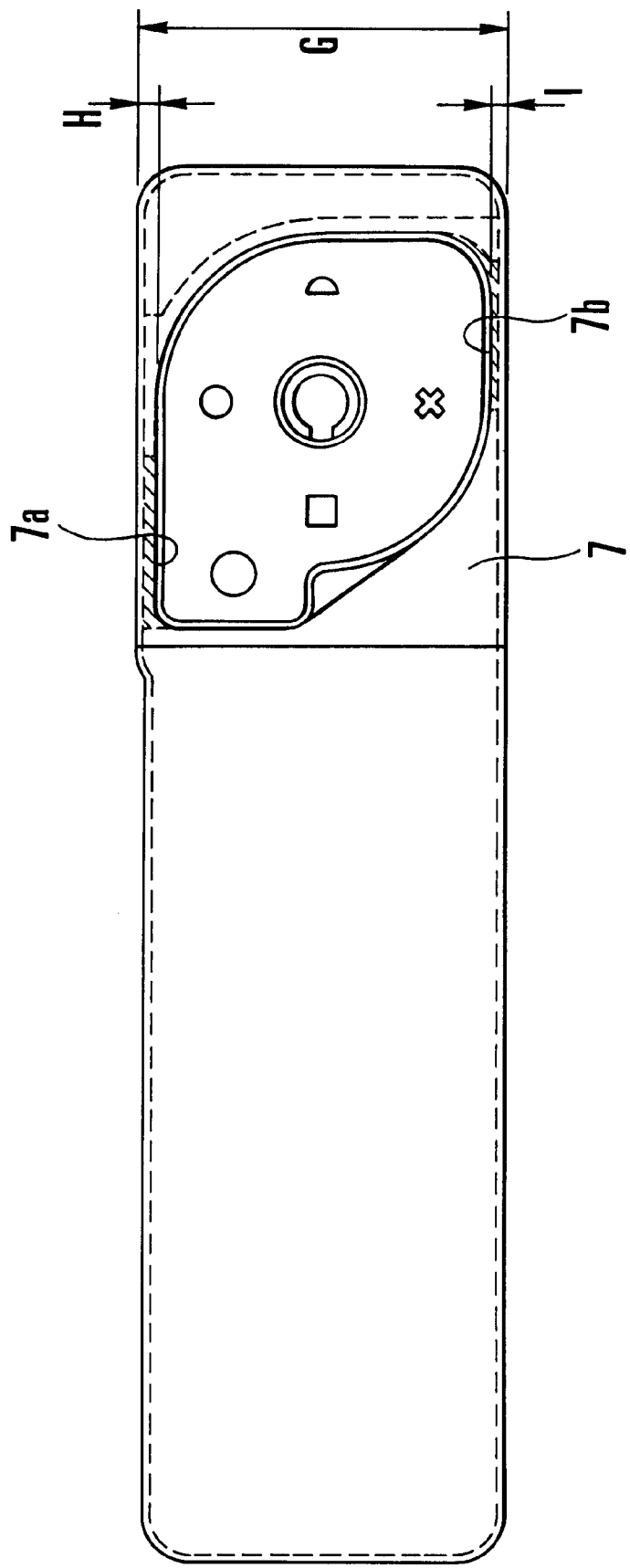
FIG. 13 is a bottom view of the camera of FIG. 10.

FIGS. 11 to 13 are cross-sectional views of the camera for explaining the operation of the second embodiment of the invention. FIG. 11 shows a state that the film cartridge is in the setting phase and the film 18 is pulled out of the cartridge for feeding. In the setting phase, the film cartridge 1 is positioned such that the ridgelines 1e and 1f of the film cartridge 1, which are rotationally asymmetric about the spool shaft 1a, are rotated about four degrees in the clockwise direction (i.e., toward the rear side of the camera body), about the spool shaft 1a with respect to a plane that is perpendicular to the optical axis 14a of the photographing lens 14. Therefore, if the camera has a reduced thickness in the direction of the optical axis 14a of the photographing lens 14, the cartridge chamber 9 cannot be formed over the entire periphery thereof, as shown in FIG. 11. On the other hand, as shown in FIG. 12, after the film 18 has been completely rewound into the film cartridge 1, the opening/closing driver 11 is disengaged from the film outlet opening/closing actuation member 1c of the film cartridge 1, and the film cartridge 1 is rotated about four degrees in the counterclockwise direction around the spool shaft 1a .

The film cartridge 1 shown in FIG. 12 is in the ejection phase, at which the film cartridge 1 has a minimum thickness in the direction of the optical axis 14a. Accordingly, as shown in FIG. 13, the cartridge insertion opening member 7 can have sufficient edge widths H and I on the front and rear sides in the direction of the optical axis 14a, and the slopes 7a and 7b for rotating the film cartridge 1 can be formed there. In addition, the opening in the cartridge insertion opening member 7, to which the packing 13 on the cartridge chamber lid 2 is fitted, is formed continuously over its entire periphery. As a result, the cartridge chamber 9 can be sufficiently shielded against light, and a thickness G of the camera can be minimized.

Modification of First and Second Embodiments

Figure 14:
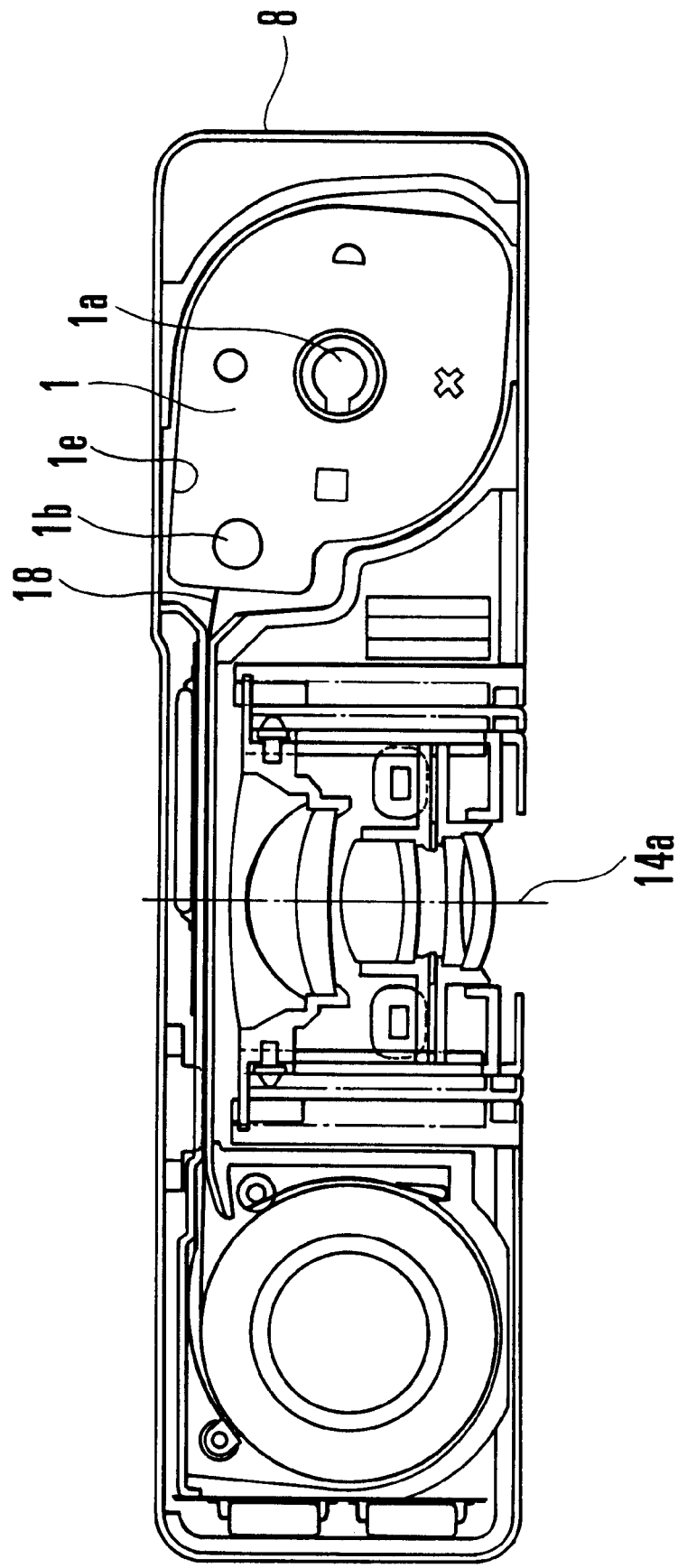
FIG. 14 is a cross-sectional view of a camera according to a modification of the first and second embodiments, showing a state that a film is under thrust driving.
Figure 15:
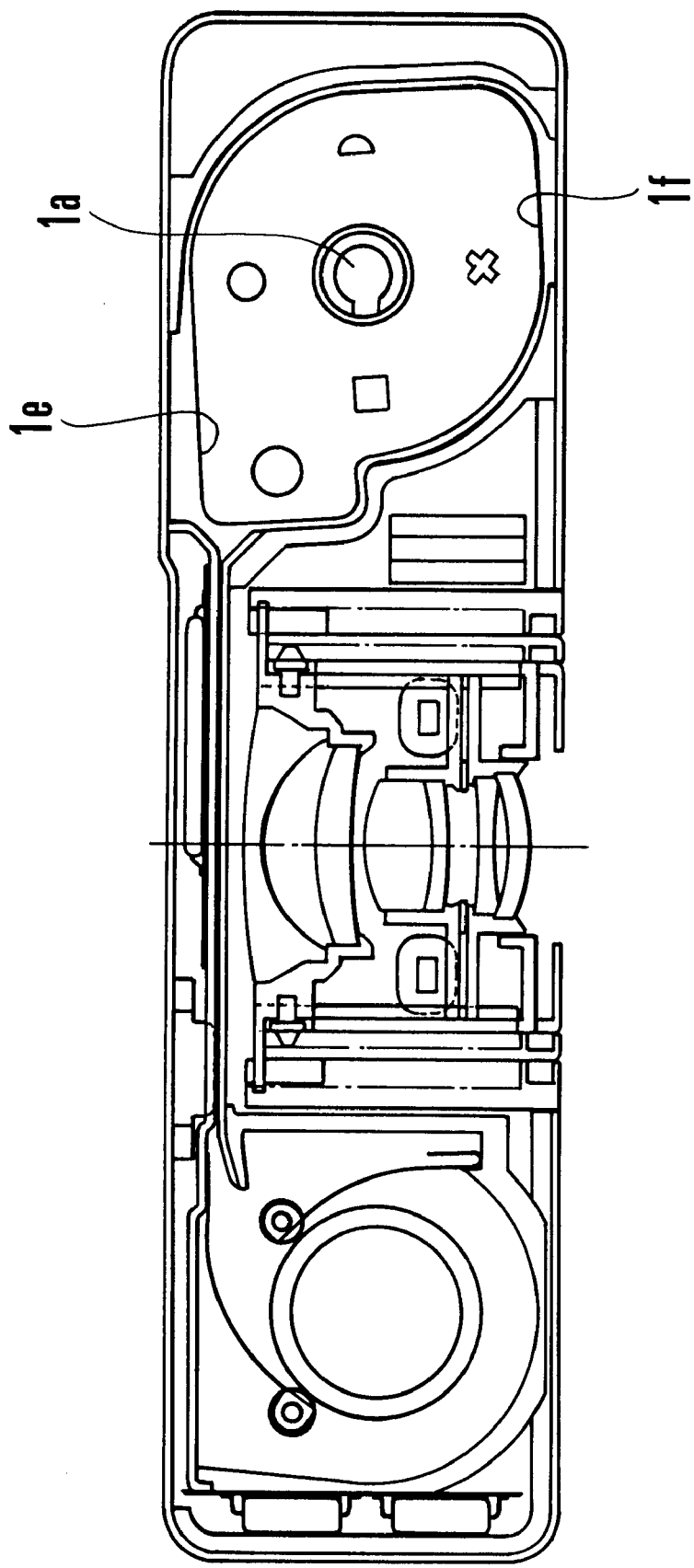
FIG. 15 is a cross-sectional view of the camera of FIG. 14 according to the modification of the first and second embodiments, showing a state that a film cartridge has been rotated about four degrees in the counterclockwise direction.
Figure 16:
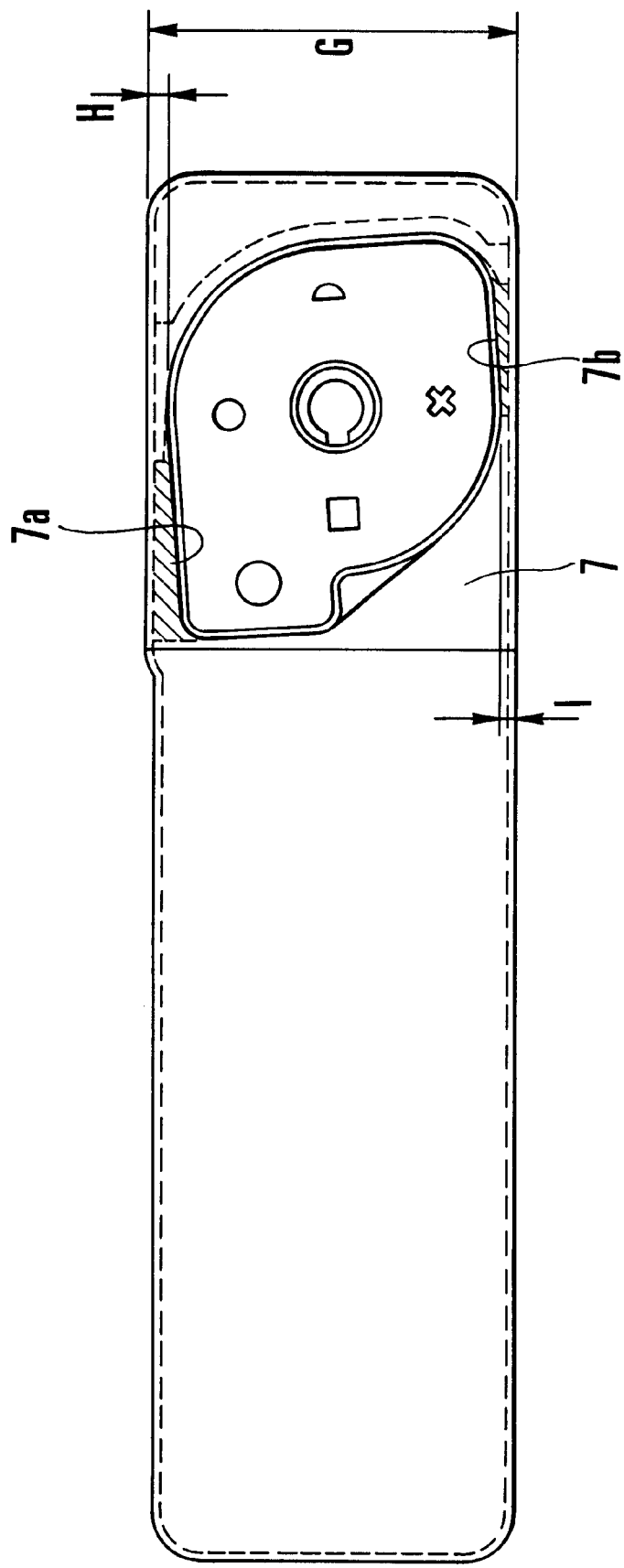
FIG. 16 is a bottom view of the camera of FIG. 14.

FIGS. 14 to 16 show a modification of the first and second embodiments of the invention. Of these figures, FIGS. 14 and 15 are cross-sectional views of a camera, and FIG. 16 is an appearance view of the camera in a state that the cartridge chamber lid 2 is opened, although the cartridge chamber lid 2 is omitted from illustration.

This modification differs from the first and second embodiments in that the film cartridge 1 is rotated a larger angle in the counterclockwise direction from the setting phase to the ejection phase (i.e., the ridgeline 1e of the film cartridge 1 is inclined toward the front side of the camera body unlike the position of the ridgeline 1e in the first embodiment which is perpendicular to the optical axis 14a of the photographing lens 14). In the ejection phase state of the film cartridge 1 shown in FIG. 15, the film cartridge 1 also has a minimum size in the direction of the optical axis 14a of the photographing lens 14. By so setting a larger rotational angle between the setting phase and the ejection phase, as shown in FIG. 16, the minimum edge widths H and I of the cartridge insertion opening member 7 need to be formed only in much shorter portions than in the case of FIG. 13. As a result, the cartridge chamber lid 2 can be closed relative to the cartridge insertion opening member 7 with an improved degree of shield against light, and the strength of the cartridge insertion opening member 7 can be improved.

Third Embodiment

Figure 17:
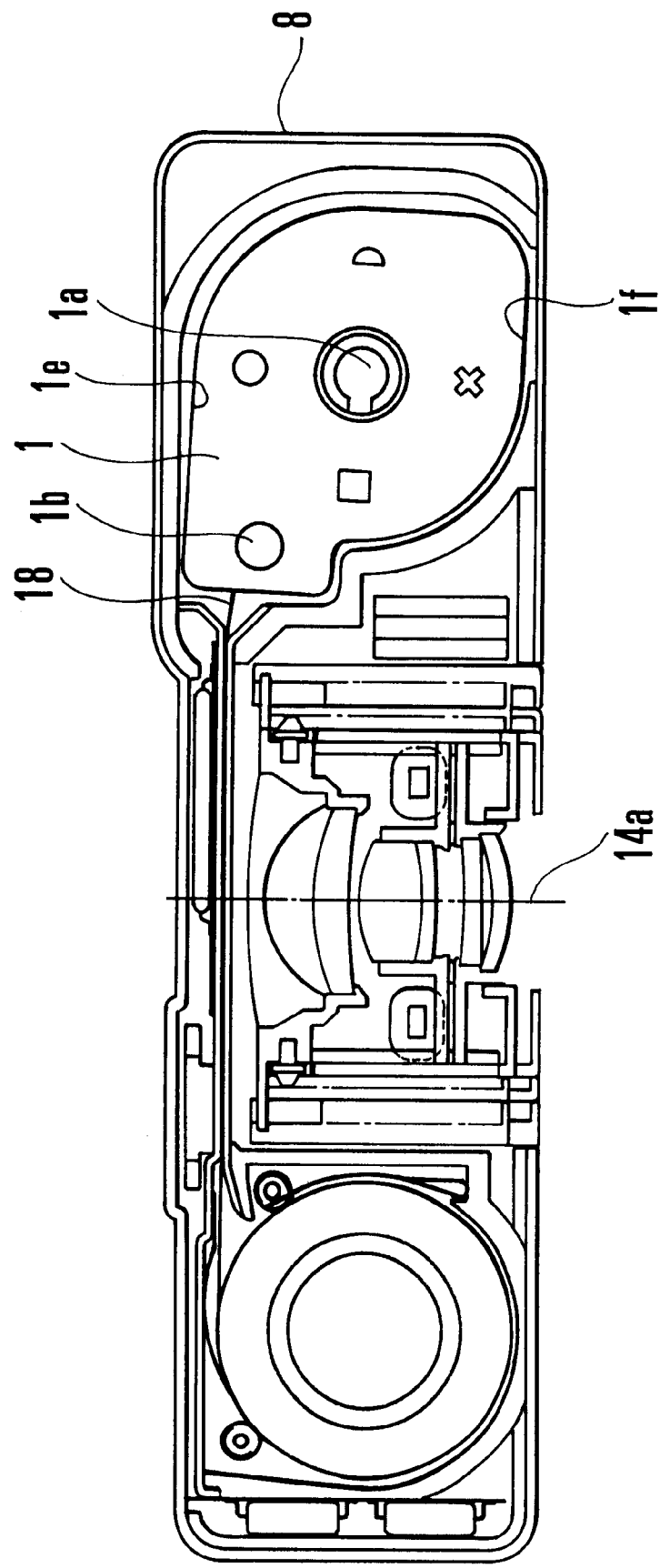
FIG. 17 is a cross-sectional view of a camera according to a third embodiment of the invention, showing a state that a film is under thrust driving.
Figure 18:
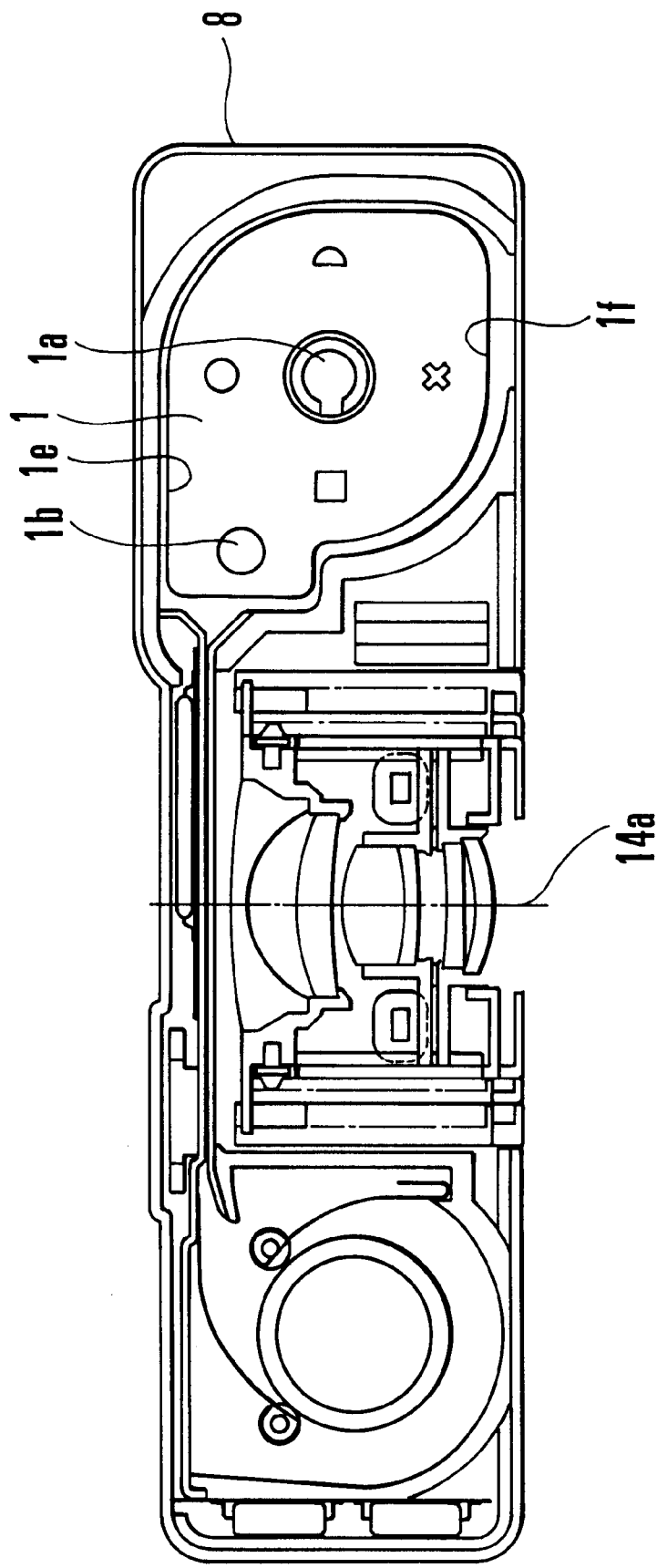
FIG. 18 is a cross-sectional view of the camera of FIG. 17, showing a state that a film cartridge has been rotated in the counterclockwise direction.
Figure 19:
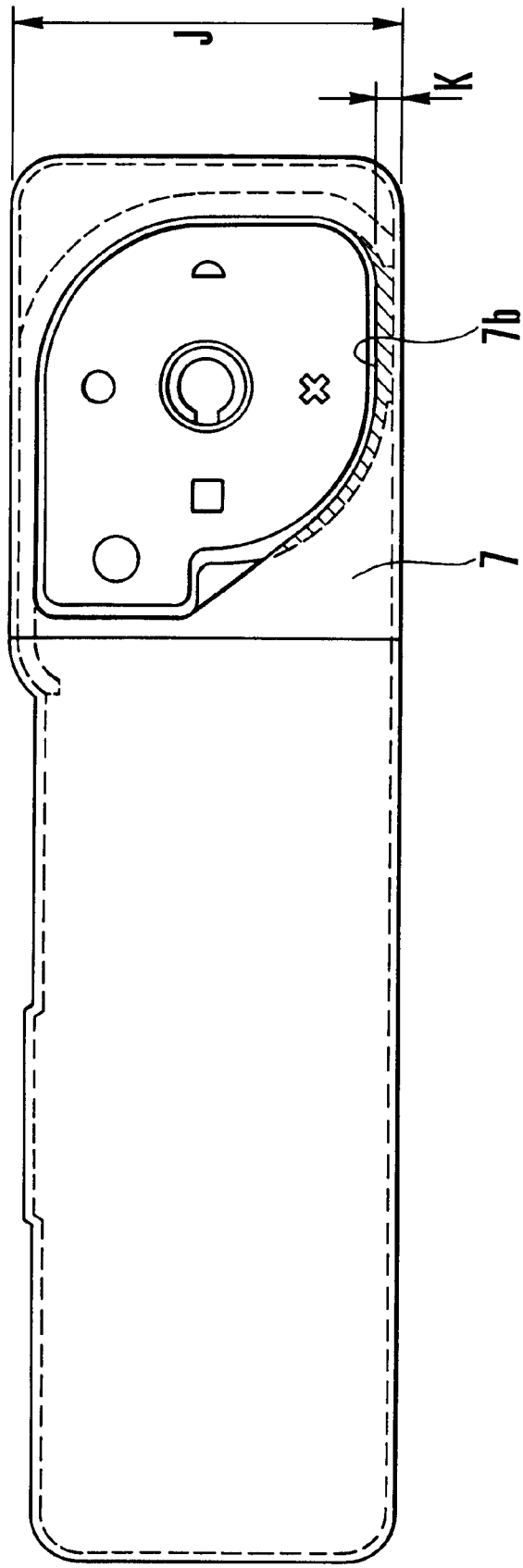
FIG. 19 is a bottom view of the camera of FIG. 17.

FIGS. 17 to 19 show a third embodiment of the invention. Of these figures, FIGS. 17 and 18 are cross-sectional views of a camera, and FIG. 19 is an appearance view of the camera in a state that the cartridge chamber lid 2 is opened (although the cartridge chamber lid 2 is omitted from illustration). FIG. 17 shows a setting phase state in which the film cartridge 1 takes an angle optimum for transporting a film.

FIG. 18 shows an ejection phase state in which the film cartridge 1 has a minimum size in the direction of the optical axis 14a of the photographing lens 14 as a result of retracting the fork shaft 10 from the film cartridge 1 after the film 18 has been completely rewound into the film cartridge 1, and then rotating the opening/closing driver 11 about four degrees in the counterclockwise direction from the setting phase state of FIG. 17.

FIG. 19 shows a state that the film cartridge 1 is being ejected in the ejection phase state. In FIG. 19, a sufficient edge width K of the cartridge insertion opening member 7 can be ensured because the film cartridge 1 is rotated from the setting phase to the ejection phase, and, therefore, a thickness J of the camera in the direction of the photographing optical axis 14a can be reduced. Further, the cartridge chamber lid 2 can be closed relative to the cartridge insertion opening member 7 with a sufficient degree of shield against light, similarly to the first embodiment.

In the embodiments described above, the position of the film cartridge which has been completely loaded is changed under action of the slopes, etc., so that the film outlet of the film cartridge is oriented rearward at a predetermined angle. However, the invention may include any other suitable loading angle setting means with which the orientation of the film outlet of the film cartridge taken when the film cartridge has been completely loaded into the cartridge chamber is changed to the direction toward the rear from the orientation of the film outlet of the film cartridge taken when the film cartridge passes the cartridge insertion opening of the cartridge chamber.

Also, in the embodiments described above, during the ejection operation, the film cartridge is oriented forward by a predetermined angle under action of the slopes, etc., when the film cartridge passes the cartridge insertion opening of the cartridge chamber. However, the invention may include any other suitable ejection angle setting means with which the orientation of the film outlet of the film cartridge taken when the film cartridge passes the cartridge insertion opening is changed to the direction toward the front from the orientation of the film outlet of the film cartridge taken when the film cartridge has been completely loaded into the cartridge chamber.

It should be noted that the invention is not limited to the embodiments described above, but may be modified in various ways so long as the functions defined in claims or the functions obtained by the constructions of the embodiments can be achieved.

For example, the invention is also applicable to other types of cartridges than the cartridge described in the above embodiments.

Also, the invention may be implemented in combinations of the above embodiments and modifications, and individual technical elements disclosed therein as needed.

The invention can be applied to various forms of cameras such as single-lens reflex cameras, lens-shutter cameras and video cameras, optical and other apparatuses other than the cameras, devices for use in the cameras and those optical and other apparatuses, as well as elements thereof.

Further, the invention may be implemented such that the whole or a part of the features of claims or the above embodiments constitute one stand alone apparatus, or an apparatus combined with another apparatus, or an element of those apparatuses.

According to the above-described embodiments of the invention, when the invention is applied to an optical apparatus such as a camera, it is possible to minimize a thickness of the optical apparatus in a direction perpendicular to the film transporting direction, i.e., a thickness of the camera in the direction of a photographing optical axis, and to sufficiently shield the cartridge insertion opening against light.

What is claimed is:

1. A cartridge loading apparatus for a camera, comprising:
    a cartridge chamber into which a film cartridge is loaded;
    first setting means for setting a film outlet of the film cartridge to orient in a predetermined direction during process of loading the film cartridge into the cartridge chamber; and
    second setting means for setting the film outlet of the film cartridge to orient in a direction angularly deviating from the predetermined direction when the film cartridge passes a cartridge insertion opening of the cartridge chamber during process of unloading the film cartridge from the cartridge chamber.

2. A cartridge loading apparatus according to claim 1, wherein said first setting means includes means for setting the film outlet of the film cartridge to orient rearward at a predetermined angle with respect to a direction perpendicular to a photographing optical axis in the state where the film cartridge has been completely loaded into the cartridge chamber.

3. A cartridge loading apparatus according to claim 2, wherein said second setting means includes means for setting the film outlet of the film cartridge to orient forward at the predetermined angle from the rearward oriented position when the film cartridge passes the cartridge insertion opening of the cartridge chamber.

4. A cartridge loading apparatus according to claim 2, wherein said first setting means includes means for setting the film outlet of the film cartridge to orient rearward four degrees with respect to the direction perpendicular to the photographing optical axis.

5. A cartridge loading apparatus according to claim 1, wherein said first setting means includes guide means for guiding, during process of loading the film cartridge, the film cartridge into a state where the film outlet of the film cartridge orients in the predetermined direction set by said first setting means from a state where the film outlet of the film cartridge orients in a direction different from the predetermined direction set by said first setting means.

6. A cartridge loading apparatus according to claim 5, wherein said guide means includes means for guiding, during process of loading the film cartridge, the film cartridge into a state where the film outlet of the film cartridge orients in the predetermined direction set by said first setting means from a state where the film outlet of the film cartridge orients in the angularly deviating direction set by said second setting means.

7. A cartridge loading apparatus according to claim 5, wherein said guide means includes a cam portion provided in the cartridge chamber.

8. A cartridge loading apparatus according to claim 5, wherein said guide means includes a slope portion provided in the cartridge chamber.

9. A cartridge loading apparatus according to claim 5, wherein said guide means includes a cam portion provided at opening/closing drive means for driving a film outlet opening/closing actuation member of the film cartridge.

10. A cartridge loading apparatus according to claim 5, wherein said first setting means includes an engagement member which engages the film cartridge to position the film cartridge, and wherein said guide means includes a cam portion provided at said engagement member.

11. A cartridge loading apparatus according to claim 1, wherein said first setting means includes drive means for driving a film supply member of the film cartridge.

12. A cartridge loading apparatus according to claim 11, wherein said drive means includes means for rotating the film supply member of the film cartridge.

13. A cartridge loading apparatus according to claim 1, wherein said first setting means includes opening/closing drive means for driving a film outlet opening/closing actuation member of the film cartridge.

14. A cartridge loading apparatus according to claim 13, wherein said first setting means includes means for acting in response to said opening/closing drive means engaging the film outlet opening/closing actuation member.

15. A cartridge loading apparatus according to claim 1, wherein said second setting means includes guide means for, during process of ejecting the film cartridge, guiding the film cartridge into a state where the film outlet of the film cartridge orients in the angularly deviating direction set by said second setting means from a state where the film outlet of the film cartridge orients in a direction different from the angularly deviating direction set by said second setting means.

16. A cartridge loading apparatus according to claim 15, wherein said guide means includes means for, during process of ejecting the film cartridge, guiding the film cartridge into a state where the film outlet of the film cartridge orients in the angularly deviating direction set by said second setting means from a state where the film outlet of the film cartridge orients in the predetermined direction set by said first setting means.

17. A cartridge loading apparatus according to claim 15, wherein said guide means includes a cam portion provided in the cartridge chamber.

18. A cartridge loading apparatus according to claim 15, wherein said guide means includes a slope portion provided in the cartridge chamber.

19. A cartridge loading apparatus according to claim 15, wherein said guide means includes a cam portion provided at opening/closing drive means for driving a film outlet opening/closing actuation member of the film cartridge.

20. A cartridge loading apparatus according to claim 15, wherein said first setting means includes an engagement member which engages the film cartridge to position the film cartridge, and wherein said guide means includes a cam portion provided at said engagement member.

21. A cartridge loading apparatus according to claim 1, wherein said second setting means includes drive means for driving a film supply member of the film cartridge.

22. A cartridge loading apparatus according to claim 21, wherein said drive means includes means for rotating the film supply member of the film cartridge.

23. A cartridge loading apparatus according to claim 1, wherein said second setting means includes a portion of opening/closing drive means for driving a film outlet opening/closing actuation member of the film cartridge.

24. A cartridge loading apparatus according to claim 1, wherein said second setting means includes means for acting in response to opening/closing drive means for driving a film outlet opening/closing actuation member of the film cartridge rotating the film cartridge.

25. A cartridge loading apparatus according to claim 2, wherein said second setting means includes means for setting the film outlet o f the film cartridge to orient in the direction perpendicular to the photographing optical axis when the film cartridge passes the cartridge insertion opening of the cartridge chamber.

26. A cartridge loading apparatus according to claim 2, wherein said second setting means includes means for setting the film outlet of the film cartridge to orient forward with respect to the direction perpendicular to the photographing optical axis when the film cartridge passes the cartridge insertion opening of the cartridge chamber.

27. A cartridge loading apparatus according to claim 1, further comprising:
   a cartridge chamber lid for opening and closing the cartridge insertion opening of the cartridge chamber;
   a packing for sealing off a gap between said cartridge chamber lid and the cartridge insertion opening of the cartridge chamber when said cartridge chamber lid is closed; and
   a packing receiving portion provided, as a member separate from a member constituting the cartridge chamber, at the cartridge insertion opening of the cartridge chamber.

28. A cartridge loading apparatus according to claim 27, wherein a wall surface of the cartridge chamber includes a portion formed of a metal-made outer casing cover.

29. A cartridge loading apparatus according to claim 28, wherein said packing receiving portion is made of plastic.

30. A cartridge loading apparatus according to claim 1, wherein the cartridge chamber includes means for enabling the film cartridge to be loaded therein, the film cartridge having an opening/closing lid for opening and closing the film outlet of the film cartridge and an opening/closing actuation member for opening and closing said opening/closing lid, and wherein said cartridge loading apparatus includes opening/closing drive means for opening and closing said opening/closing lid by operating said opening/closing actuation member of the film cartridge.

31. A cartridge loading apparatus according to claim 30, wherein said first setting means includes means for coming into an operative state when said opening/closing drive means and said opening/closing actuation member come into an associated state.

32. A cartridge loading apparatus according to claim 30, wherein said second setting means includes means for coming into an operative state when association between said opening/closing drive means and said opening/closing actuation member is severed.

33. A cartridge loading apparatus according to claim 31, wherein said first setting means includes means for coming into an operative state when said opening/closing drive means and said opening/closing actuation member come into an engaged state.

34. A cartridge loading apparatus according to claim 32, wherein said second setting means includes means for coming into an operative state when engagement between said opening/closing drive means and said opening/closing actuation member is severed.

35. A cartridge loading apparatus according to claim 1, wherein the cartridge chamber includes means for enabling the film cartridge to be loaded therein, the film cartridge having a film supply actuation member operable to supply a film from the film cartridge, and wherein said cartridge loading apparatus includes film supply drive means for operating said film supply actuation member of the film cartridge.

36. A cartridge loading apparatus according to claim 35, wherein said first setting means includes means for coming into an operative state when said film supply drive means and said film supply actuation member come into an associated state.

37. A cartridge loading apparatus according to claim 35, wherein said second setting means includes means for coming into an operative state when association between said film supply drive means and said film supply actuation member is severed.

38. A cartridge loading apparatus according to claim 36, wherein said first setting means includes means for coming into an operative state when said film supply drive means and said film supply actuation member come into an engaged state.

39. A cartridge loading apparatus according to claim 38, wherein said second setting means includes means for coming into an operative state when engagement between said film supply drive means and said film supply actuation member is severed.

40. A camera, comprising:

a cartridge chamber into which a film cartridge is loaded;

first setting means for setting a film outlet of the film cartridge to orient in a predetermined direction during process of loading the film cartridge into the cartridge chamber; and second setting means for setting the film outlet of the film cartridge to orient in a direction angularly deviating from the predetermined direction when the film cartridge passes a cartridge insertion opening of the cartridge chamber during process of unloading the film cartridge from the cartridge chamber.

* * * * *

UNITED STATES PATENT AND TRADEMARK OFFICE
CERTIFICATE OF CORRECTION

PATENT NO. : 6,275,663 B1
DATED : August 14, 2001
INVENTOR(S) : Masakazu Taku

It is certified that error appears in the above-identified patent and that said Letters Patent is hereby corrected as shown below:

Column 4,
Line 16, delete "FIG. 3" and insert -- FIG. 8 --.

Column 7,
Line 5, delete "-the" and insert -- the --.

Column 12,
Line 6, delete "o f" and insert -- of --.

Signed and Sealed this

Thirtieth Day of April, 2002

Attest:

Attesting Officer

JAMES E. ROGAN
*Director of the United States Patent and Trademark Office*